(12) United States Patent
Nuzman

(10) Patent No.: US 8,817,903 B2
(45) Date of Patent: Aug. 26, 2014

(54) METHODS AND SYSTEMS FOR REDUCING CROSSTALK

(75) Inventor: Carl Nuzman, Union, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/399,515

(22) Filed: Feb. 17, 2012

(65) Prior Publication Data
US 2013/0215951 A1 Aug. 22, 2013

(51) Int. Cl.
*H04L 1/02* (2006.01)

(52) U.S. Cl.
USPC ........................................................ 375/267

(58) Field of Classification Search
USPC ......... 375/267, 130, 260, 346, 347, 348, 349; 370/206, 386; 703/231, 250; 455/3.01, 455/403
See application file for complete search history.

(56) References Cited

U.S. PATENT DOCUMENTS

| 2003/0236904 | A1* | 12/2003 | Walpole et al. ............... 709/231 |
| 2009/0092036 | A1* | 4/2009 | Peeters et al. ................. 370/201 |
| 2010/0195816 | A1* | 8/2010 | Ahrndt et al. ............ 379/406.06 |
| 2010/0202554 | A1 | 8/2010 | Kramer et al. |
| 2010/0329386 | A1* | 12/2010 | De Lind Van Wijngaarden ................. 375/296 |
| 2012/0195183 | A1 | 8/2012 | Nuzman et al. |

FOREIGN PATENT DOCUMENTS

| EP | 2 012 517 | 1/2009 |
| WO | WO 2010/002908 | 1/2010 |
| WO | WO 2011/142741 | 11/2011 |

OTHER PUBLICATIONS

"Self-FEXT cancellation (vectoring) for use with VDSL2 transceivers", International Telecommunication Union, ITU-T G.993.5,, Telecommunication Standardization Sector of ITU, Series G: Transmission Systems and Media, Digital Systems and Networks, Digital sections and digital line system—Access networks, Recommendation ITU-T G.993.5, Apr. 2010.

Oksman et al., "The ITU-T's New G.vector Standard Proliferates 100 Mb/s DSL", ITU Standards, IEEE Communications Magazine, pp. 140-148, Oct. 2010.

International Search Report and Written Opinion dated May 15, 2013.

* cited by examiner

*Primary Examiner* — Khai Tran

(74) *Attorney, Agent, or Firm* — Harness, Dickey & Pierce, P.L.C.

(57) ABSTRACT

At least one example embodiment discloses a method of determining crosstalk in a multiple-input-multiple output (MIMO) system. The method includes receiving, from at least one first remote node, upstream pilots on an upstream channel, determining upstream channel coefficients based on the received pilots, transmitting, to the at least one first remote node, downstream pilots on a downstream channel, receiving, from the at least one first remote node, loopback pilots on the upstream channel, the loopback pilots being loopback signals of the downstream pilots, and determining downstream channel coefficients based on the received downstream pilots.

18 Claims, 12 Drawing Sheets

METHODS AND SYSTEMS FOR REDUCING CROSSTALK

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two VDSL2 lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Crosstalk channel compensating filters can be used to reduce the effects of crosstalk on the communication line or to compensate for the crosstalk in order to remove the problem almost entirely.

Each communication line is a possible disturber line which induces crosstalk in one or more victim lines. By transmitting test signals across all the lines, it is possible to determine the influence of each disturber line on the victim lines. The test signals can be characterized by the way in which power is allocated to one or more tones or frequencies. For instance, a test signal may be transmitted using a particular power level over a small frequency range. The victim line may notice this power in that frequency range and be able to determine the amplitude of that power. The amplitude of the induced influence of crosstalk on a particular line is a good reference to determine how strong particular crosstalk disturbers are into that victim or which frequencies or tones are susceptible to the crosstalk of certain crosstalker disturbers into that victim.

Precoding (also referred to as precompensation) techniques are based on transmitting an additional signal added to the data signal which is used to compensate the crosstalk on a victim line from external sources. Thus, instead of reducing the effect of crosstalk or avoiding crosstalk effects by configuring the communication line in an appropriate way, precoding can be used to compensate for the effects of crosstalk on a communication channel. Precoding techniques are based on crosstalk channel information that includes both amplitude and phase information. Such information can be obtained from measurements such as slicer error or signal-to-noise ratio (SNR). A particular example of such measurements for precoding is the use of pilot sequences and error feedback. The use of pilot sequences in G.vector is described in "Self-FEXT cancellation (vectoring) for use with VDSL2 transceivers," *Series G: Transmission Systems and Media, Digital Systems and Networks, ITU G.993.5*, Apr. 2010, the entire contents of which is incorporated by reference.

SUMMARY

Example embodiments are directed to methods and systems for reducing crosstalk. Moreover, methods and systems according to example embodiments improve data rates across short copper twisted pair lines that are subject to mutual crosstalk interference. The systems may be low cost systems since components may be used in a relatively high-volume networking market.

Example embodiments may be implemented in an environment in which broadband access is provided at hundreds of Mbps using fiber optics to a distribution point, followed by copper twisted pair lines less than 200 m in length. In other words, example embodiments may be implemented where an operator is located close to a subscriber (e.g., within 200 m).

At least one example embodiment discloses a method of determining crosstalk in a multiple-input-multiple output (MIMO) system. The method includes receiving, from at least one first remote node, upstream pilots on an upstream channel, determining upstream channel coefficients based on the received pilots, transmitting, to the at least one first remote node, downstream pilots on a downstream channel, receiving, from the at least one first remote node, loopback pilots on the upstream channel, the loopback pilots being loopback signals of the downstream pilots, and determining downstream channel coefficients based on the received downstream pilots.

In one example embodiment, the upstream pilots are mutually orthogonal to upstream pilots received on other upstream channels.

In one example embodiment, the transmitting the downstream pilots transmits the downstream pilots after receiving the upstream pilots.

In one example embodiment, the downstream pilots are mutually orthogonal.

In one example embodiment, the loopback pilots are amplified by the at least one remote node.

In one example embodiment, the loopback pilots are at least one of filtered and delayed by the at least one remote node.

In one example embodiment, the method further includes precoding data based on the downstream channel coefficients and transmitting the precoded data to the remote node.

In one example embodiment, the method further includes receiving data from the at least one first remote node and postcoding the data based on the upstream channel coefficients.

In one example embodiment, the receiving upstream pilots includes, receiving a request to transmit data from one of the at least one first remote node and receiving the upstream pilots from the at least one first remote node and the other first remote nodes.

In one example embodiment, the determining upstream channel coefficients includes, determining the upstream channel coefficients based on previous upstream channel coefficients, the previous upstream channel coefficients being channel coefficients before receiving the request to transmit data.

In one example embodiment, the method further includes precoding data based on the downstream channel coefficients and transmitting the precoded data to the at least one first remote node.

In one example embodiment, the method further includes receiving data from the at least one first remote node and postcoding the data based on the upstream channel coefficients.

At least another example embodiment discloses a processor configured to, receive, from at least one first remote node, upstream pilots on an upstream channel, determine upstream channel coefficients based on the received pilots, transmit, to the at least one first remote node, downstream pilots on a downstream channel, receive, from the at least one first remote node, loopback pilots on the upstream channel, the loopback pilots being loopback signals of the downstream pilots, and determine downstream channel coefficients based on the received downstream pilots.

In one example embodiment, the processor is configured to transmit the downstream pilots orthogonally.

In one example embodiment, the processor is configured to precode data based on the downstream channel coefficients and transmit the precoded data to the remote node.

In one example embodiment, the processor is configured to receive data from the at least one first remote node and postcode the data based on the upstream channel coefficients.

In one example embodiment, the processor is configured to receive a request to transmit data from one of the at least one first remote node and receive the upstream pilots from the at least one first remote node and the other first remote nodes.

In one example embodiment, the processor is configured to determine the upstream channel coefficients based on previous upstream channel coefficients, the previous upstream channel coefficients being channel coefficients before receiving the request to transmit data.

BRIEF DESCRIPTION OF THE DRAWINGS

Example embodiments will be more clearly understood from the following detailed description taken in conjunction with the accompanying drawings. FIGS. 1-5 represent non-limiting, example embodiments as described herein.

FIG. 1 illustrates a conventional DSL system;

FIG. 2 illustrates another conventional DSL system;

FIG. 5 illustrates a method of reducing crosstalk using a pilot loop-back with NEXT and echo cancellation according to an example embodiment.

DETAILED DESCRIPTION

Figure 1:
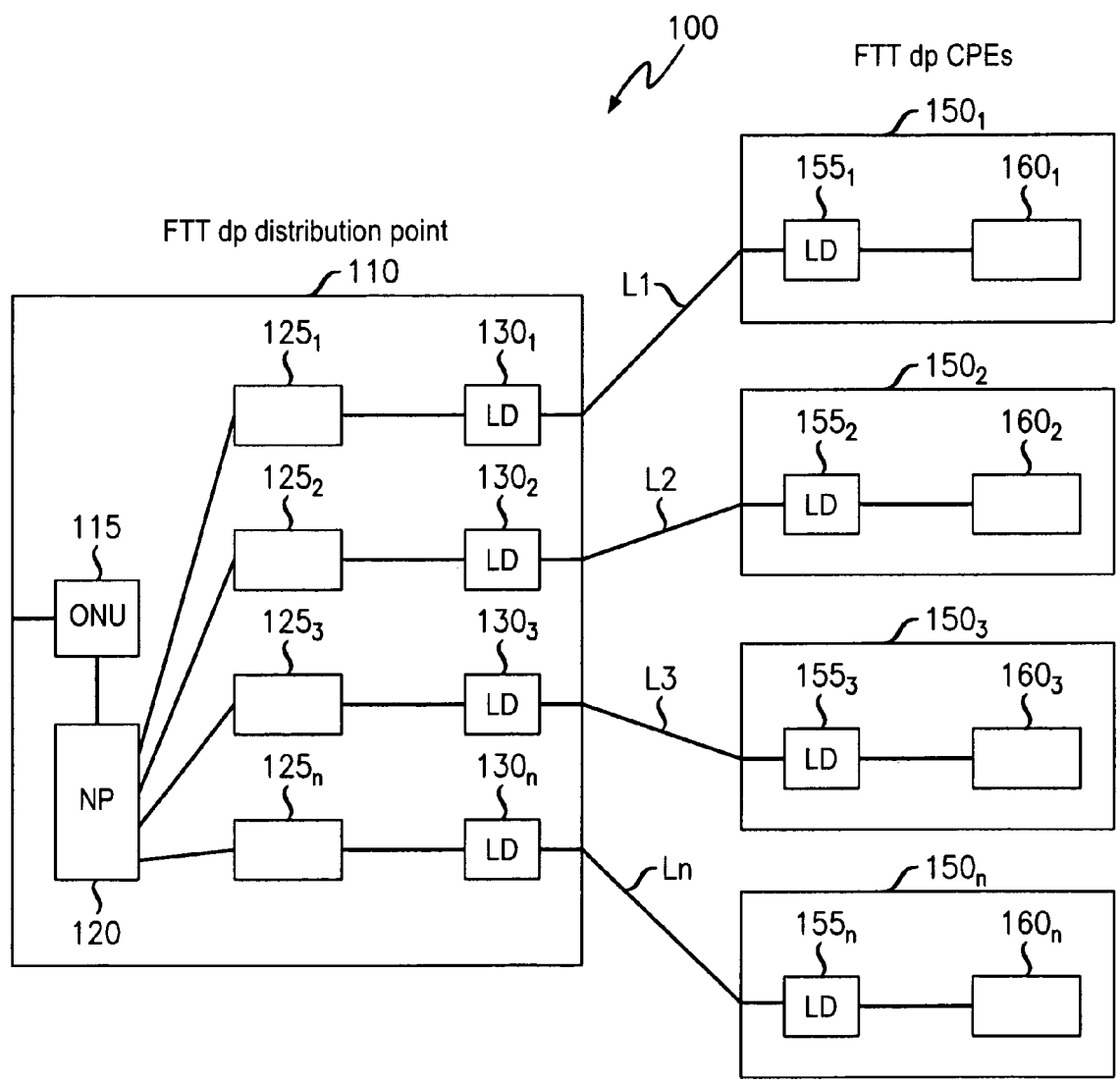

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

In the context of providing data network access to homes and businesses, various technologies collectively known as FTTx have been used or proposed. In these technologies, data is conveyed from a network operator to an intermediate location using fiber optics, and data is conveyed from the intermediate location to the customer location using DSL transmission over twisted pair copper lines. The term FTTdp refers to a scenario in which the intermediate location is a "distribution point", serving up to a few dozen customers within a distance of less than 200 m. The International Telecommunications Union (ITU) has created a working group to develop a recommendation, currently referred to as G.fast, whose purpose is to create a standards-based technology for FTTdp. Example embodiments provide applications such as communicating data at high rates (e.g. 200 Mbps) over the twisted pair section of an FTTdp network.

FIG. 1 illustrates a conventional system configured to implement G.fast. As shown, a system 100 includes a distribution point 110 and Customer Premises Equipment (CPEs) $150_1$-$150_n$. The distribution point 110 and the CPEs $150_1$-$150_n$ may be configured to implement FTTdp. In some example embodiments, the distribution point 110 may be a DSLAM (digital subscriber line access multiplexer). In other example embodiments, the distribution point 110 may include an individual optical network unit (ONU) associated with each user, and four optical fibers connected. The multiplexing of the four users into a single line would occur in the fiber optics part of the network. Each of the CPEs $150_1$-$150_n$ may be in a separate home or office with its own CPE, for example. Moreover, each of the CPEs $150_1$-$150_n$ may transmit and receive data, and therefore, may be referred to as transceivers.

The system 100 may be a DSL system, VDSL system or a VDSL2 system, for example.

The distribution point 110 may be under control of an operator. The distribution point 110 includes an ONU 115 configured to communicate with a network processor (NP) 120. As is known, the ONU 115 provides a high-bandwidth data connection over a fiber optic channel to an optical line terminal (OLT) located in a central office. The ONU passes received downstream data frames or packets to the NP 120, which then determines the destination for the frames or packets and accordingly forwards them to an appropriate G.fast interface. Similarly, in the upstream direction, the NP 120 forwards frames or packets from the G.fast interfaces to the ONU 115.

The NP 120 provides signals to processing devices $125_1$-$125_n$. Each of the processing devices $125_1$-$125_n$ provides a G.fast interface. While the number of processing devices $125_1$-$125_n$ shown is four, the number of processing devices $125_1$-$125_n$ may be greater than or less than four. The processing devices $125_1$-$125_n$ may be physical layer single-input-single-output (SISO) processing devices. In one example, processing devices $125_1$-$125_n$ are built for the G.hn (G.9960) home networking standard and are adapted for point-to-point communication. The G.hn home networking standard sets forth the communication standards for home devices such as set top boxes, laptops and smart power boxes, for example. The G.hn home networking standard allows these home devices to communicate at high data rates.

Each of the processing devices $125_1$-$125_n$ may communicate with one of the CPEs $150_1$-$150_n$ over communication lines L1-Ln through an associated line driver (LD) $130_1$-$130_n$. The communication lines L1-Ln may be twisted line pairs that carry electromagnetic signals. As should be understood, the communications are not limited to twisted line pairs. The system 100 may communicate using G.hn signals, VDSL signals, and Ethernet signals, for example. Each pair of processing devices $125_1$-$125_n$ and associated LDs $130_1$-$130_n$ may transmit and receive data, and therefore, may be referred to as transceivers.

The processing devices $125_1$-$125_n$ modulate the data, generating a time-domain digital signal to the LDs $130_1$-$130_n$ consisting of a sampled sequence of values to transmit. The LDs $130_1$-$130_n$ then convert the digital signal to analog form, amplify it, and transmit the analog signal over the communication lines L1-Ln, respectively, to the CPEs $150_1$-$150_n$, respectively.

FIG. 1 shows a total of four communication lines connected to the distribution point 110. However, a distribution point may be connected to a larger number of lines than four. In addition, a precoding group may not be limited to the lines connected to a single distribution point. A precoding group may for instance contain several tens of lines which are distributed over a number of distribution points. In such case, coordination between distribution points may be required. FIG. 1 furthermore only shows the elements in the communication network which are relevant for the understanding of example embodiments. Therefore, elements such as network equipment to which the distribution point is connected, links connecting the distribution point to such equipment, intermediary devices, etc., are not shown in this figure.

While the number of CPEs $150_1$-$150_n$ shown is four, the number of processing devices CPEs $150_1$-$150_n$ may be greater than or less than four. Each of the CPEs $150_1$-$150_n$ includes an associated line driver $155_1$-$155_n$ and processing device $160_1$-$160_n$.

The processing devices $160_1$-$160_n$ may be the same or substantially the same as the processing devices $125_1$-$125_n$ and, therefore, will not be described in greater detail for the sake of brevity.

In FIG. 1, the distribution point 110 and the CPEs $150_1$-$150_n$ are separated by a distance that is within a communication distance suitable for high data rate communication using modulation techniques that are the same as or similar to those set forth in the G.hn home networking standard (e.g., within 200 m for communication at 200 Mbps). Therefore, the processing devices $125_1$-$125_n$ and $160_1$-$160_n$ may be G.hn processing devices. If G.hn processing devices are produced in high volumes for the home networking market, these processing devices may be less expensive than processing devices specifically designed for the FTTdp market. Consequently, the system 100 has a reduced cost as opposed to processing devices specifically designed for FTTdp.

To adapt the G.hn standard to a point-to-point FTTdp application, some changes may be required. In G.hn, a single transmission medium is shared by multiple transceivers, and so transmission of DMT symbols is coordinated through a medium access control protocol. The loop topology of an FTTdp scenario would favor scheduling symbol transmissions, and in particular alternating periods of upstream and downstream transmission. In G.hn, the receivers determine channel coefficients based on preamble symbols that are sent before each data frame. For FTTdp, it is likely that channel coefficients would be determined using an initialization procedure, and maintained through occasional tracking. Nevertheless, much of the core signal processing required to modulate and demodulate data symbols could be identical.

The communication lines L1-Ln may extend from the distribution point 110 to the CPEs $150_1$-$150_n$, respectively.

However, the system 100 may be subject to crosstalk if the lines L1-Ln are not sufficiently physically separated.

More specifically, any one of the lines L1-Ln may be considered a victim line and the remaining lines L1-Ln may be considered disturber lines. Each of the lines L1-Ln may be associated with a customer. For the sake of clarity and brevity, L1 will be described as the victim line.

Near end crosstalk (NEXT) is the coupling that occurs between a transmitted signal at one side of a disturber line, for example, the communication lines L2-Ln, and a signal at a transceiver (not shown) at the same end of the victim line L1. For example, coupling between signals transmitted from the LD $130_2$ into the receiver at the LD $130_1$ is near-end crosstalk.

Contrary to NEXT, far end crosstalk (FEXT) occurs, for example, when signals sent from the distribution point 110 into the disturber lines L2-Ln couple into victim line L1 and cause interference to the receiver at CPE $150_1$, or signals sent from the CPEs $150_2$-$150_n$ into the disturber lines L2-Ln couple into victim line L1 and cause interference to the receiver at LD $130_1$.

In the system 100, data rates could be impacted by crosstalk interference between the communication lines L1-Ln.

To avoid crosstalk interference, a scheduler may be added to the distribution point 110. The scheduler allows one subscriber to transmit at a time. An interface would need to be defined between the G.hn processing devices $125_1$-$125_n$ and the scheduler. In this way, each user can achieve high peak rates without being affected by crosstalk.

However, when using scheduling, the communication lines L1-Ln become a shared medium, and the average data rates are inversely proportional to the number of active lines. With a scheduler, there is only one active line at a time.

To improve performance, vectoring can be used. Vectoring is also referred to crosstalk cancellation. Crosstalk cancellation improves data rates and allows simultaneous communication over multiple lines, instead of scheduling. Crosstalk cancellation in VDSL2 is described in ITU G.993.5, "Self-FEXT cancellation (vectoring) for use with VDSL2 transceivers," *Series G: Transmission Systems and Media, Digital Systems and Networks, ITU G.993.5*, April 2010, also known as the G.vector recommendation.

G.vector adds crosstalk cancellation capability to VDSL2. This allows high data rates (e.g., many tens of Mbps) across medium distances (e.g., hundreds of meters). But the limitation of the VDSL2 standard to 30 MHz does not allow G.vector to take full advantage of the data rates that can be achieved a short distances below 200 m. In other words, the signals transmitted by VDSL2 devices are only allowed to use frequencies from 0 to 30 MHz. This was not a problem in the past, because higher frequencies than 30 MHz do not travel very far through twisted pair cable. However, now that FTTdp is being considered, the signals don't have to travel very far since the cables are short, and so frequencies well above 30 MHz are useful.

Figure 2:
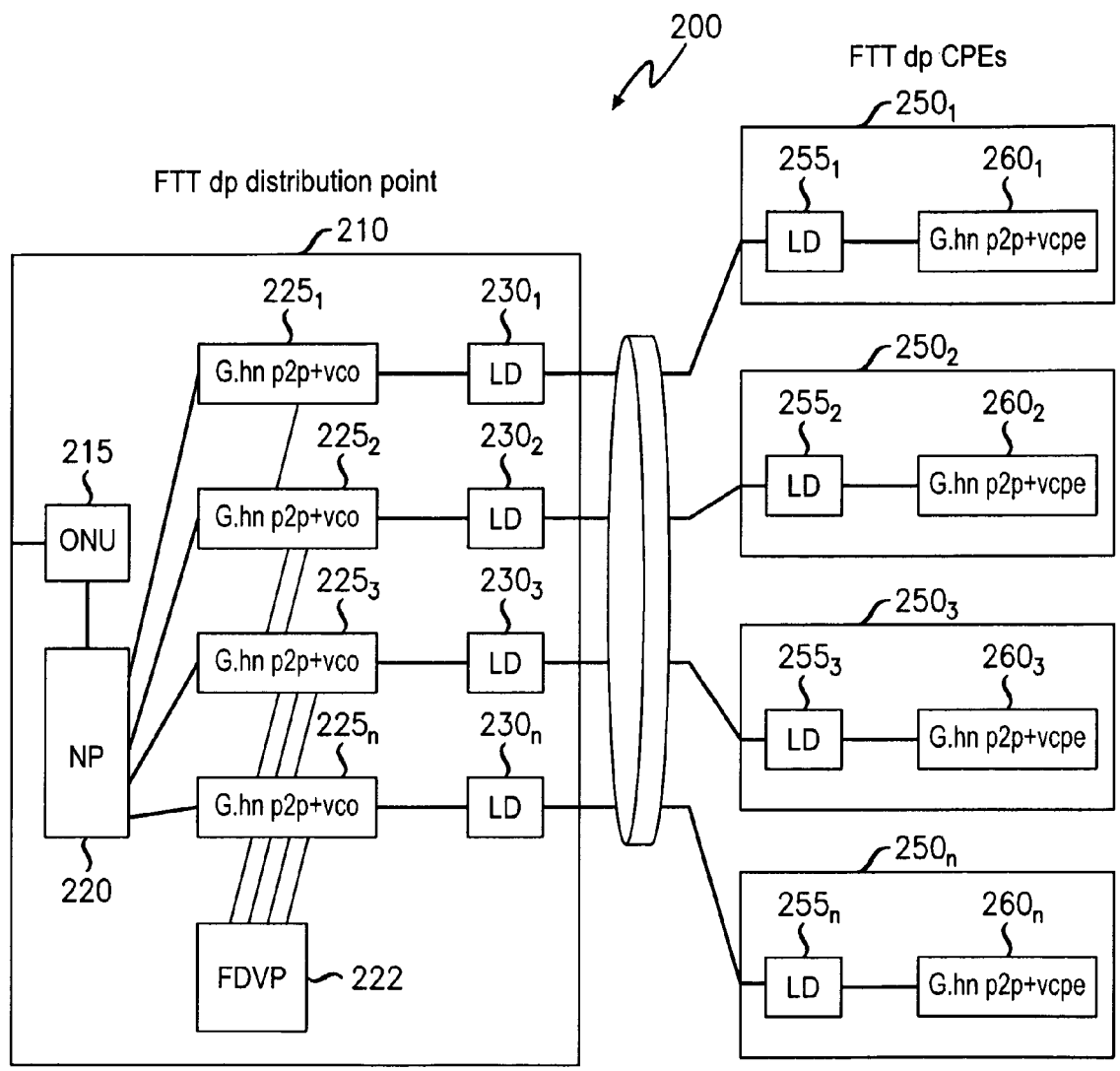

FIG. 2 illustrates a conventional system for vectoring (crosstalk cancellation). As shown in FIG. 2, a system 200 includes a distribution point 210 and Customer Premises Equipment (CPEs) $250_1$-$250_n$.

In the system 200, the techniques defined in G.vector are extended to a new physical layer standard that uses a higher transmission bandwidth to get much higher rates. The distribution point 210 may be under control of an operator. The distribution point 210 includes an optical network unit (ONU) 215 configured to communicate with an NP 220. The ONU 215 and the NP 220 are the same as the ONU 115 and the NP 120, respectively, and therefore, will not be described in greater detail.

The NP 220 provides signals to processing devices $225_1$-$225_n$. While the number of processing devices $225_1$-$225_n$ shown is four, the number of processing devices $225_1$-$225_n$ may be greater than or less than four. The processing devices $225_1$-$225_n$ are built for the G.hn home networking standard and are adapted for point-to-point communication.

The distribution point 210 further includes a frequency domain vector processor (FDVP) 222. The FDVP 222 communicates with the processing devices $225_1$-$225_n$.

More specifically, in the downstream direction, the FDVP 222 receives frequency domain signal data from the processing devices $225_1$-$225_n$, applies crosstalk filter coefficients to precompensate the signal data against crosstalk, and provides the processing devices $225_1$-$225_n$ with the precompensated signal data. For example, assuming that the physical layer is based on discrete multitone (DMT) signaling, the frequency domain data could include a representation of a sequence of complex values, representing the constellation points to be transmitted on each of several tones (also known as subcarriers). The processing devices $225_1$-$225_n$ process the precompensated frequency domain data to generate precompensated time-domain signals, which are then communicated to the line drivers $230_1$-$230_n$. In the upstream direction, the processing devices $225_1$-$225_n$ receive crosstalk-contaminated time-domain signals from the line drivers $230_1$-$230_n$, and convert them to crosstalk-contaminated frequency-domain signal data. The FDVP 222 receives crosstalk-contaminated frequency-domain signal data from the processing devices $225_1$-$225_n$, applies crosstalk filter coefficients to post-compensate the received signals for crosstalk, and provides the processing devices $225_1$-$225_n$ with the post-compensated frequency-domain signal data. The processing devices $225_1$-$225_n$ then continue to process the frequency-domain signal data to demodulate the intended upstream information.

The FDVP 222 determines the crosstalk filter coefficients in the frequency domain in accordance with the pilot-based estimation algorithms supported by G.vector. The algorithms are based on sending pilot sequences both upstream and downstream, measuring error signals, forwarding error signals to the FDVP 222, and correlating error signals against transmitted pilots.

Each of the processing devices $225_1$-$225_n$ may communicate with one of the CPEs $250_1$-$250_n$ over the communication lines L1-Ln through an associated line driver (LD) $230_1$-$230_n$. For example, the processing device $225_1$ may provide time-domain signals to the LD $230_1$ for the purpose of conveying user data to the CPE $250_1$ over the communication line L1. In addition to the time-domain signal provided to the LD $230_1$, the processing device $225_1$ provides an additional signal to the FDVP 222 that is processed based on the crosstalk filter coefficients, together with similar additional signals from processing devices $225_2$-$225_n$. After precompensation or postcompensation, the FDVP 222 provides a return signal to processing device $225_1$ that is further processed by processing device $225_1$, in a manner that reduces and/or eliminates the crosstalk emanating from the additional lines L2-Ln.

Each of the CPEs $250_1$-$250_n$ includes a line driver $255_1$-$255_n$ and a processing device $260_1$-$260_n$. Each of the line drivers $255_1$-$255_n$ may be the same or substantially the same as the line drivers (LD) $230_1$-$230_n$.

In order to implement the FDVP 222, the processing devices $225_1$-$225_n$ must be configured to enable crosstalk cancellation. In particular, an interface is created that allows the processing devices $225_1$-$225_n$ to communicate frequency-domain data to and from the FDVP 222. In addition, the hardware or software controlling the processing devices $225_1$-$225_n$ must provide a mechanism for sending downstream pilot signals, for estimating error signals relative to upstream pilot signals, and for forwarding error signals to the FDVP 222. The hardware or software controlling the processing devices $260_1$-$260_n$ must provide a mechanism for sending upstream pilot signals, for estimating error signals relative to downstream pilot signals, and for forwarding error signals over the upstream communication channel to the processing devices $225_1$-$225_n$. The initialization procedures used to establish new communication sessions between processing devices $225_1$-$225_n$ and processing devices $260_1$-$260_n$ must be modified to avoid disruption of active communication sessions between these processing devices. Because of all of the special features needed to support vectoring, the processing devices $225_1$-$225_n$ and $260_1$-$260_n$ need to be substantially different than the processing devices $125_1$-$125_n$ and $160_1$-$160_n$, shown in FIG. 1. Consequently, it is unlikely that the processing devices $225_1$-$225_n$ can be reduced in cost by sharing high-volume production with processing devices for the home networking market. Consequently, the vectoring-capable system 200 can be expected to be much more expensive than the system 100.

Figure 3A:
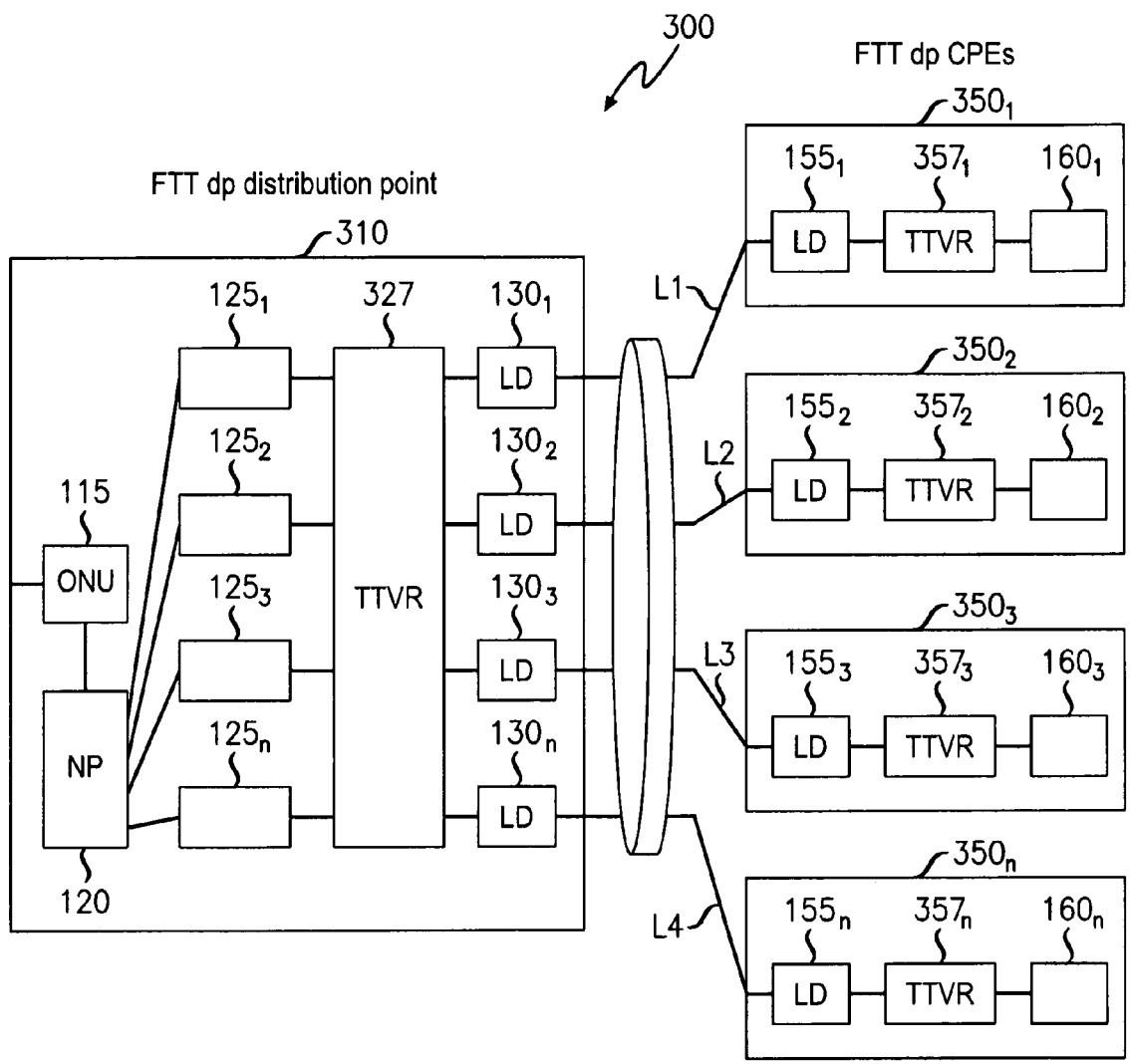
FIG. 3A illustrates a system according to an example embodiment.

FIG. 3A illustrates a system for cancelling crosstalk according to an example embodiment. In FIG. 3A, a system 300 cancels crosstalk through vectoring, in a transparent way that does not require any changes to G.hn processing devices. That is, the G.hn processing devices can be used in scenarios with and without crosstalk. For crosstalk environments, devices are inserted between the digital and analog portions of the signal chain; these devices perform vectoring, independently of a physical layer operation, and create a channel that is effectively crosstalk free. This approach is referred to here as transparent time-domain vectoring (TTV). Here, a channel is referred to as a system mapping input signals to output signals over a medium in a way that enables communication.

The system 300 is the same as the system 100, in FIG. 1, except a distribution point 310 includes a time domain vector processor (TTVP) 327 and CPEs $350_1$-$350_n$ include time domain vector repeaters (TTVR) $357_1$-$357_n$. The TTVP 327 may simply be referred to as a processor. For the sake of brevity, only the differences will be described.

As shown in FIG. 3A, the TTVP 327 is in the communication path between the processing devices $125_1$-$125_n$ and the line drivers $130_1$-$130_n$.

In FIG. 3A, inputs and outputs of the TTVP 327 and the TTVRs $357_1$-$357_n$ are digital, time-domain samples.

The TTVP 327 precompensates (precodes) downstream signals and post-compensates upstream signals. Moreover, the TTVP 327 sends and receives pilot signals to and from the CPEs $350_1$-$350_n$ to determine the filter coefficients needed for the crosstalk cancellation function. The TTVP 327 estimates the upstream channels and associated filter coefficients based on pilot signals sent upstream by the TTVRs $357_1$-$357_n$, as further described below. The TTVP 327 estimates the downstream channels based on pilot signals sent downstream by the TTVP 327 and then looped back upstream by the TTVRs $357_1$-$357_n$. Consequently, the TTVP 327 may provide information to a processing device that does not need to be designed for crosstalk cancellation. In other words, crosstalk between high volume G.hn processing devices, another type of SISO processing device, may be cancelled with the use of the TTVP 327 and the TTVRs $357_1$-$357_n$. The TTVP 327 determines crosstalk filter coefficients using pilot signals, as is described below.

The pilot signals transmitted by the TTVP 327 and the TTVRs $357_1$-$357_n$ may be orthogonal frequency-division multiplexing (OFDM) signals.

The TTVP 327 prevents signals from the processing devices $125_1$-$125_n$ from reaching the line drivers $130_1$-$130_n$ until the filter coefficients are determined. By preventing the signals from reaching the line drivers $130_1$-$130_n$ until the filter coefficients are determined, operation of active sessions on other communication lines is protected from interference. For example, if active sessions are in place on the LDs $130_2$-$130_n$, the TTVP 327 may prevent signals from the processing device $125_1$ from reaching the LD $130_1$ until the filter coefficients that cancel crosstalk from the line L1 into the lines L2 through Ln, and from the lines L2 through Ln into the line L1, are determined.

The TTVRs $357_1$-$357_n$ send and receive pilot signals used by the TTVP 327 to determine crosstalk filter coefficients needed for the cancellation function, which is described in greater detail below. It should be understood that the TTVRs $357_1$-$357_n$ are the same. Thus, where possible, only one TTVR will be described for the purposes of clarity and brevity.

The TTVRs $357_1$-$357_n$ prevent physical layer signals from reaching the LDs $130_1$-$130_n$ until the TTVP 327 indicates that the filter coefficients are correct. In a normal operation, the TTVRs $357_1$-$357_n$ receive values as input and repeat them as output. To prevent signals from reaching the LDs $130_1$-$130_n$, the TTVRs $357_1$-$357_n$ and TTVP 327 provide zero values as output instead. The TTVP 327 may communicate that the filter coefficients are correct over a control channel between TTVP 327 and the TTVRs $357_1$-$357_n$. For example, the TTVP 327 and a TTVR $357_1$-$357_n$ could use differential phase-shift keying (DPSK) signaling at a particular frequency. If a narrow bandwidth is used, the interference between data channels and the control channel can be limited. In an example system, data may be modulated using 4096 DMT subcarriers with 16 KHz subcarrier spacing, while the control channel could use DPSK signaling taking up approximately 1 KHz bandwidth.

The TTVP 327 includes a precoder to precode downstream signals for the CPEs $350_1$-$350_n$. The precoder is frequency dependent. Thus, the TTVP 327 is configured to transform time domain samples into the frequency domain for the precoder and then transform the precoded data from the frequency domain into time domain samples. The precoder may be implemented, for example, by an overlap-and-add Fast Fourier Transform (FFT) method.

In the overlap-and-add FFT method implemented by the precoding filter, T time samples are zero padded by W samples, an (T+W)-point FFT is applied to obtain (T+W) Fourier components. This procedure is carried out in parallel for the signals from n active lines. Then, for each Fourier component, the vector of n values from the n active lines is multiplied by an n by n matrix to obtain a precompensated (precoded) vector (downstream) or post-compensated vector (upstream). Next, inverse (T+W) point FFTs are applied to the result on each line, resulting in T+W time samples. The first T samples are added to W saved values from the previous iteration to produce T output samples, and the remaining W values are saved to be used in the next iteration. In choosing the parameters W and T, the parameter W should be large enough to cover a period of time greater than the delay spread of the direct and crosstalk channels. The parameter T should be large enough to keep the relative windowing overhead (T+W)/T sufficiently small. The FFT size T+W does not need to be the same as the FFT size used for DMT modulation by the processing devices $125_1$-$125_n$, and advantageously could be much smaller in some cases.

For upstream pilots, the TTVRs $357_1$-$357_n$ temporarily ignore incoming physical layer data from the processing devices $160_1$-$160_n$, and send instead time-domain pilot samples. The upstream pilot signals from a given TTVRs $357_1$-$357_n$ will propagate to all of the FTTdp LDs $130_1$-$130_n$, either by the direct channel or by crosstalk. For example, the TTVR $357_1$ receives physical layer samples from the processing device $160_1$. The TTVR $357_1$ would normally convey the physical layer sample to the LD $155_1$. During the upstream pilot operations, instead of conveying the physical layer sample, the TTVR $357_1$ inserts time-domain pilot sample.

The TTVP 327 receives the time-domain signals from the LDs $130_1$-$130_n$ that result from the pilot signals inserted into the upstream channel by each TTVR $357_1$-$357_n$. The received pilots are used by the TTVP 327 to estimate the upstream direct channel and crosstalk channel coefficients. While pilot signals are being inserted by the TTVRs $357_1$-$357_n$, the TTVP 327 may pass on to the physical layer the resulting samples, samples with value zero, or random noise. This appears to an upstream physical layer receiver (e.g., the processing device $125_1$) as a temporary loss of signal or impulse noise For downstream pilots, the TTVP 327 temporarily ignores incoming physical layer signals from the processing devices $125_1$-$125_n$, and instead, sends time-domain pilot samples.

For example, each processing device $125_1$-$125_n$ sends out a sequence of numbers at a certain clock rate; a different number at the end of each clock cycle. The TTVP 327 reads those numbers in at the same rate, and produces numbers on the other side which go to the corresponding LD $130_1$-$130_n$ at the same rate. Likewise for upstream, the LD $130_1$-$130_n$ sends one number to the TTVP 327 every clock cycle, and the TTVP 327 sends one number to a given processing device $125_1$-$125_n$ in every clock cycle. These numbers may be referred to as physical layer signals.

In an example, the TTVP 327 receives a physical layer signal sample from the processing device $125_1$. Instead of conveying the physical layer sample to the LD $130_1$, the TTVP 327 inserts a time-domain pilot signal. The TTVP 327 is configured to replace physical layer samples with time-domain pilot samples for all channels (e.g., between TTVP 327 and all LDs $130_1$-$130_n$) in the system 300.

The TTVR $357_1$ receives the time domain signals from the LD $155_1$ resulting from the pilot signals inserted by the TTVP 327 into the LD $130_1$ and crosstalk from the pilot signals inserted by the TTVP 327 into the LDs $130_2$-$130_n$. Based on the received pilot signals, the TTVR $357_1$ provides feedback information received from the received pilot signals. In at least one example embodiment, the TTVR $357_1$ processes the received pilot signals to estimate downlink channel coefficients, and sends the results to the TTVP 327 through a communication channel.

The term feedback, as used in this document, refers to a means by which the transceiver of a communication system such as a CPE communicates to a transceiver of the communication system such as a distribution point values derived from received pilot signals.

In another example embodiment, the TTVR $357_1$ loops-back the received downstream pilot signals in the upstream direction, with amplification, enabling the TTVP to form its own estimated channel coefficients. In another example embodiment, the loop-back may be without amplification. The pilot signals and loop-back pilots appear as loss of signal or as impulse noise to the downstream and upstream physical layer receivers (processing devices $125_1$-$125_n$ and $160_1$-$160_n$). Note that the loop-back approach is more appropriate for a time-division duplex (TDD) rather than frequency-division duplex (FDD) system, since the loop-back signal sent upstream occupies similar frequency bands as the downstream signal. This TDD approach is described in greater detail with reference to FIG. 4A, which is described in detail below.

Figure 3B:
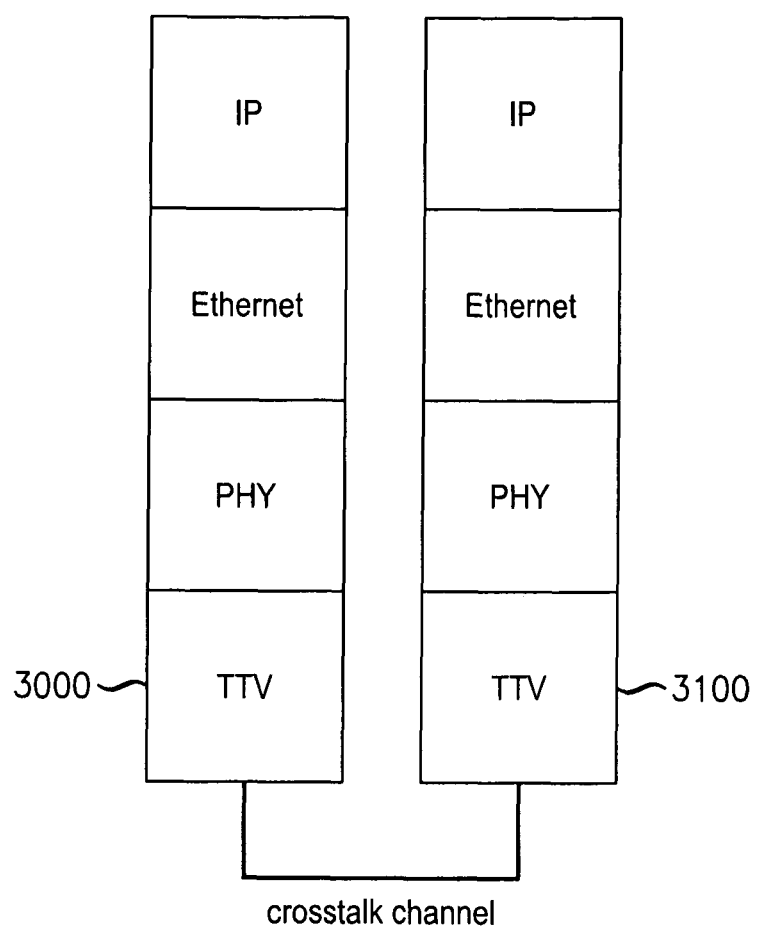
FIG. 3B illustrates an architecture of the system of FIG. 3A.

As shown in FIG. 3B, the system 300 is organized conceptually into layers, including a TTV layer 3000, 3100, in addition to physical (PHY), Ethernet and Internet Protocol (IP) layers. The TTV layer 3000 may be a layer associated with a TTVP (e.g., TTVP 327) and the TTV layer 3100 may be associated with a TTVR (e.g., TTVR $357_1$).

The architecture shown in FIG. 3B uses in-band communication between the TTVP and the TTVR. The communication is in-band because the TTV layer 3000, 3100 operates even when there is no higher layer communication session established. The following downstream messages are communicated from the TTVP to the TTVR: (1) Request pilot signal, with specified sign (positive or negative), at specific time, (2) Request loop-back signal, at specified time, (3) Instruct TTVR to begin relaying US/DS samples (for example, after precoder/postcoder training is complete), and (4) Instruct TTVR to stop relaying US/DS samples (for example, as part of an orderly shut-down procedure). Additionally, parameters of loop-back amplification filter may be defined in the downstream messages.

The following upstream messages are communicated from the TTVR to the TTVP: (1) Indicate readiness to create a connection and (2) Indicate imminent shut-down of a connection. Additionally, acknowledgement of receipt of various downstream messages may be included in the upstream messages.

In an example embodiment, a signaling channel between TTVP and TTVR implements a tone based approach, where the TTVP and TTVR transmit a pilot tone signal on pre-specified downstream and upstream frequencies. The pilot tone signal is added on top of any other signal passing through. The TTVP communicates bits by inverting the pilot tone, at a low bit rate (i.e. using binary DPSK). This creates the downstream (DS) vectoring operations channel (VOC). Similarly the upstream pilot tone is modulated to create an upstream (US) VOC. When the TTVR is able to detect the DS VOC, the TTVR echoes the received bits, providing an acknowledgement of correct reception, in an example embodiment. When the TTVR does not detect the DS VOC, the TTVR sends a pre-specified idle pattern. When the TTVR is shut down or is about to shut down, the US pilot tone disappears. Thus, the presence or absence of the US pilot tone, and the echoed bits, provides the US messages.

In an example embodiment, downstream messages are sent by the TTVP in a format using the DS VOC. For example, a pre-specified bit sequence indicates a request to send a pilot signal. The TTVR acknowledges the request in the echoed bits on the US VOC. The pilot signal is then sent by the TTVR at a specified time-lag after the echoed message is received.

The VOC operates in the presence of interference from physical layer transmissions, crosstalk from other VOC channels (during TTV initialization), and from external noise including RFI. These forms of interference could be mitigated as follows, (1) the physical layer signal may be notched to avoid interfering with VOC (it will have low SNR at VOC frequencies anyway.) Even if the physical layer is not notched, the VOC can achieve some SNR gain by averaging over a long time window because the VOC modulation is much slower than the physical layer modulation.

As should be understood, "notched" means that a signal is filtered or generated in such a way that it has little or no energy near a certain frequency. In a plot of signal energy versus frequency, the plot has a notch (dips abruptly) at the specified frequency.

Figure 3C:
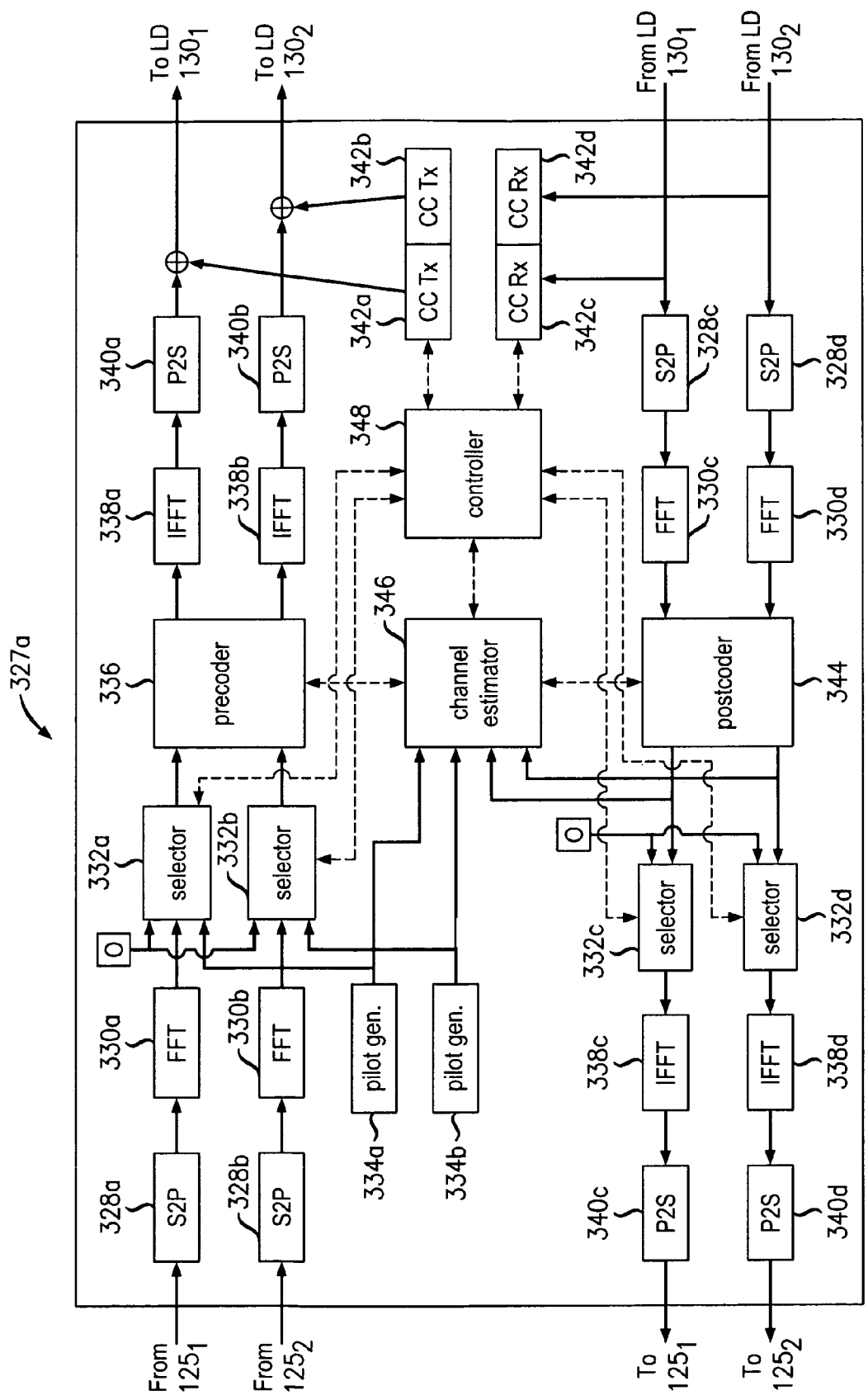
FIG. 3C illustrates a TTVP according to an example embodiment.

FIG. 3C illustrates a TTVP according to an example embodiment.

FIG. 3C illustrates a portion 327a of the TTVP 327. For simplicity, FIG. 3C illustrates the portion 327a for vectoring with 2 lines. It should be clear how to modify the diagram for arbitrary n.

At the top left is the interface for receiving downstream time domain samples generated by two processing devices $125_1$ and $125_2$. At the top right, is the interface by which downstream time domain samples are sent to LDs $130_1$ and $130_2$. At the bottom right is the interface by which upstream time domain samples are received from LDs $130_1$ and $130_2$. At the bottom left are interfaces by which upstream time-domain samples are sent to processing devices $125_1$ and $125_2$.

In a downstream operation, each serial-to-parallel converter 328a, 328b collects time domain samples from the associated processing device $125_1$, $125_2$, into batches of length T, and zero pads to a vector of length T+W. Fast Fourier Transform units 330a, 330b apply the FFT to the respective vectors. Each selector 332a, 332b passes along the FFT components during normal operation. At other times, the selector 332a, 332b may insert zero values, or frequency-domain pilot signals $P_k(f,s)$ coming from an associated pilot generator 334a, 334b based on the mode of operation (e.g., channel estimation) of the TTVP 327.

A precoder 336 performs 2×2 matrix multiplications on the Fourier components. Inverse FFT units 338a, 338b transform the output from the precoder 336 back to respective time domain vectors of length T+W. Each parallel-to-serial unit 340a, 340b takes an output vector of length T+W and generates T time-domain output samples, using the overlap and add method. Finally, control channel transmitters 342a, 342b may add time-domain control channel signals onto output signals from the parallel-to-serial units 340a, 340b, respectively, in order to send control channel messages to the TTVRs $357_1$-$357_2$, respectively.

In an upstream operation, serial-to-parallel converters 328c, 328d collect time domain samples into batches of length T, and zero pad to respective vectors of length T+W. Fast Fourier Transform units 330c, 330d apply the FFT to the vectors output from the serial-to-parallel converters 328c, 328d, respectively. A postcoder 344 performs 2×2 matrix multiplications on each of the Fourier components produced by the FFT units 330c, 330d. Selectors 332c, 332d receive zero values and the output of the postcoder 344. The selectors 332c, 332d output zero values or the output of the postcoder 344 based on the operation of the TTVP 327, as directed by a controller 348. Alternatively, the selectors 332c, 332d may pass another value indicating an unavailable signal to the processing devices $125_1$ and $125_2$.

The selectors 332c, 332d may be used, for example, to prevent pilot signals sent upstream from the TTVRs $357_1$-$357_2$ to the TTVP 327 from propagating to the processing devices $125_1$ and $125_2$. In cases where such pilot signals are not expected to adversely affect the operation of the processing devices $125_1$ and $125_2$, the selectors 322c, 322d may be omitted.

Inverse FFT units 338c, 338d transform back the output from the postcoder 344 to a time domain vector of length T+W. Input to the IFFT 338c corresponds to the time domain samples from the LD $130_1$ and input to the IFFT 338d corresponds to the time domain samples from the LD $130_2$.

Parallel-to-serial units 340c, 340d take output vectors of length T+W from the IFFT units 338c, 338d, respectively and generate T time-domain output samples, using the overlap and add method. A copy of the signal received from each LD $130_1$, $130_2$ is replicated and passed to an associated control channel receiver 342c, 342d, to decode control messages from the TTVRs $357_1$ and $357_2$.

Copies of postcoder output symbols are forwarded to a channel estimator 346. During times that pilot sequences or delayed loop-back sequences are being transmitted by the TTVRs $357_1$-$357_n$ over the upstream channel, the channel estimator 346 correlates postcoder output symbols with pilot symbols to obtain estimates of the resultant crosstalk channel coefficients. Using knowledge of the resultant crosstalk channel and of the existing precoder 336 and the postcoder 344 filter coefficients as explained in further detail below, the channel estimator 346 determines new precoder and postcoder filter coefficients that are applied to data from the processing devices $125_1$-$125_n$ and from the LDs $130_1$-$130_n$.

A controller 348 determines which operation the TTVP 327 is to perform. For example, the controller 348 determines whether to perform channel estimation or operate in a normal filtering mode. Therefore, the controller 348 coordinates the activities of all the features shown in FIG. 3C, determines when to send pilots, when to apply updated precoder and postcoder coefficients, and when to apply zeroes to the selectors 332a-332d.

Figure 3D:
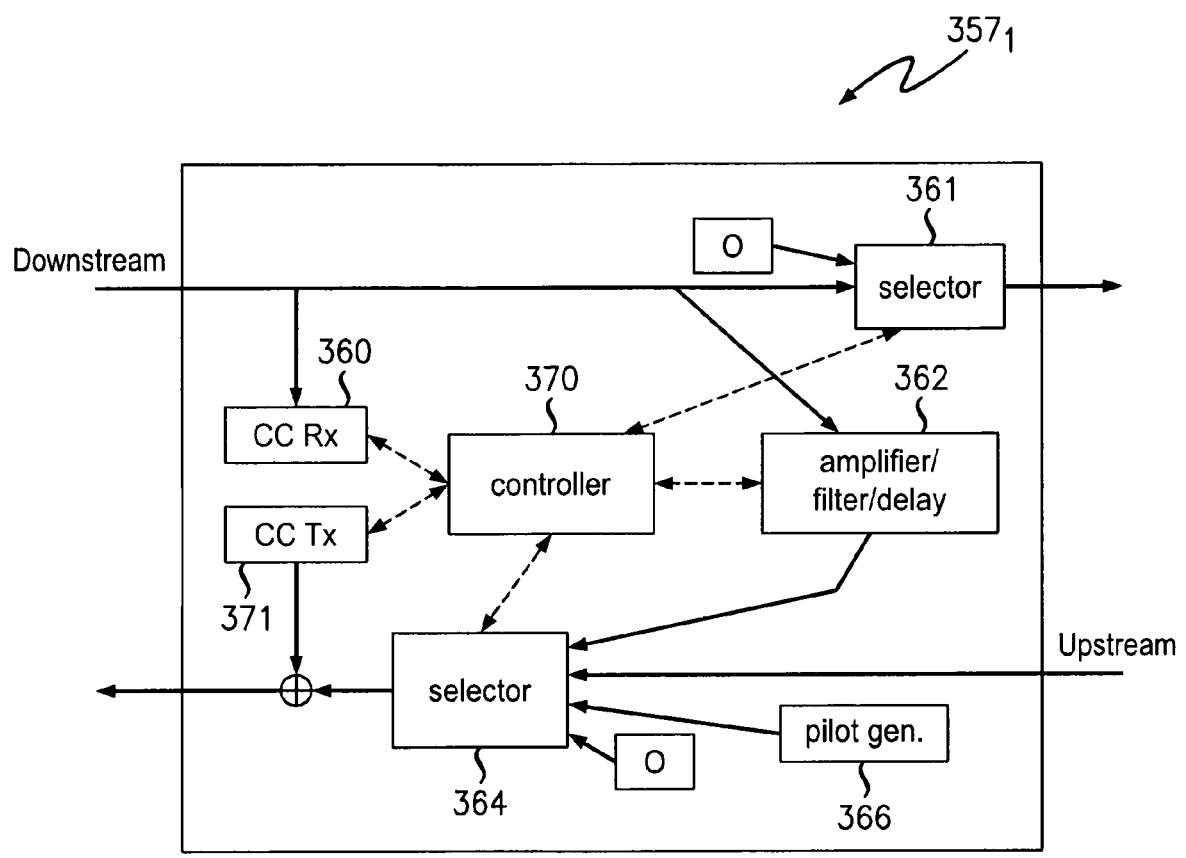
FIG. 3D illustrates a TTVR according to an example embodiment.

FIG. 3D illustrates a TTVR according to an example embodiment. More specifically, FIG. 3D illustrates an example embodiment of the TTVR $357_1$. Since the TTVRs $357_1$-$357_n$ are the same or substantially similar, only a description of the TTVR $357_1$ will be provided for the sake of brevity.

In the downstream direction, the TTVR $357_1$ normally passes time-domain received samples directly to the output. A copy of the received signal is sent to a control channel receiver 360, to decode control messages from the TTVP 327. Another copy of the received signal is forwarded to an amplification, filtering, and delay unit 362 during a loopback operation. A selector 361 receives zero values and the received signal. The selector 361 outputs zero values or the received signal based on the mode of operation of the TTVR $357_1$.

The selector 361 operates based on commands from a controller 370. When the controller 370 indicates that the TTVR $357_1$ is in a normal mode of operation, the selector 361 passes the received samples directly downstream. When the controller 370 indicates a loopback operation, the selector 361 may insert zero values to prevent pilot signals sent downstream from the TTVP 327 to the TTVR $357_1$ from propagating to the processing device $160_1$. Alternatively, the selector 361 may pass another value indicating an unavailable signal to the processing device $160_1$.

In cases where such pilot signals are not expected to adversely affect the operation of the processing device $160_1$, the selector 361 may be omitted.

The amplification, filtering and delay unit 362 may simply pass along the received signal to an output with some specified delay, or the amplification, filtering and delay unit 362 may additionally perform a filtering operation. For example, the amplification, filtering and delay unit 362 may convolve the received signal with a fixed set of filter coefficients, implementing a Finite Impulse Response (FIR) filter. Alternatively, using a recursive filter implementation, the amplification, filtering and delay unit 362 may obtain an Infinite Impulse Response (IIR) filter. The filters mitigate the effects of frequency-dependent attenuation in the downstream channel, so that the output of the amplification, filtering and delay unit 362 has significant energy on all frequencies.

The signal sent over twisted pair lines experiences frequency-dependent attenuation, and in particular higher frequencies are more strongly attenuated. In a loop-back estimation according to an example embodiment, then the pilot signal is attenuated twice, once when passing downstream through the line, and once while passing back upstream. This may lead to strong attenuation and poor estimation performance, especially for the highest frequencies. To improve estimation performance, the TTVR $357_1$ amplifies the signal during loop-back. To improve amplification without violating power spectral density constraints, the frequency-dependent amplification is (at least approximately) equal and opposite to the frequency-dependent attenuation of the twisted pair line.

To accomplish the frequency-dependent amplification, the amplification, filtering and delay unit 362 may include a plurality of finite impulse response filters, each finite impulse response filter being designed to approximately undo the attenuation of a different length of twisted pair line. For example, the plurality of finite impulse response filters may be used for lengths of 50 m, 100 m, 150 m, and 200 m, respectively, and may be designed using well-known numerical optimization techniques.

The TTVR $357_1$ may store corresponding filter coefficients. For example, the numerical optimization could be chosen, for a given filter length, to make the product of channel and filter have as close to unit gain as possible, under the constraint that the gain not exceed unity at any frequency. Based on an upstream pilot, the TTVP controller 346 decides which loopback filter of the amplification, filtering, and delay unit 362 will be effective at amplifying the loopback signal without exceeding power constraints. The TTVP 327 can then instruct the TTVR $357_1$, over the control channel, which filter to use.

The chosen filter is applied by convolving the sequence of stored filter coefficients with the received pilot signal.

In the upstream direction, the TTVR $357_1$ passes time-domain received samples into a selector 364. The selector 364 operates based on commands from the controller 370. When the controller 370 indicates that the TTVR $357_1$ is in a normal operation, the selector 364 passes the received samples directly to the output. When the controller 370 indicates a loopback operation, the selector 364 may insert zero values, or may insert time-domain pilot values from a pilot generator 366, or may insert amplified, filtered, and delayed values obtained from the amplification, filtering and delay unit 362. Finally, a control channel transmitter 371 may add a time-domain control channel signal onto the output signal from the selector 364, in order to send control channel messages to the TTVP 327.

The controller 370 is responsible for coordinating the activities of all other units in the TTVR $357_1$-$357_n$, for determining when to send pilots, and what parameters to use for the amplification and filtering.

Figure 3E:
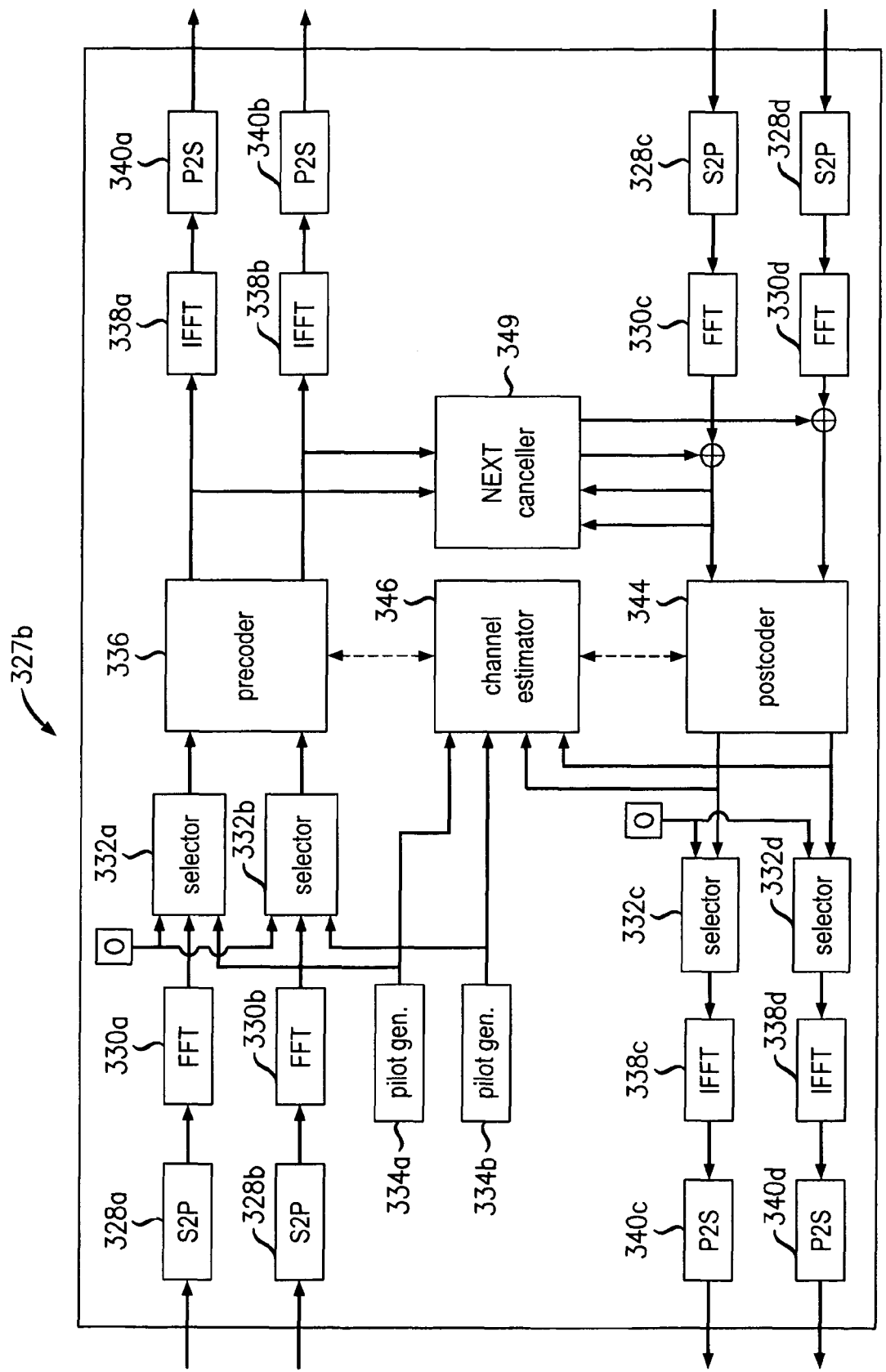
FIG. 3E illustrates a TTVP with echo and NEXT cancellation according to an example embodiment.

FIG. 3E illustrates a TTVP with NEXT cancellation according to an example embodiment. FIG. 3E illustrates a portion 327b of the TTVP 327. The portion 327b is the same as the portion 327a, except the portion 327b includes a NEXT canceller 349 coupled to the outputs of the precoder 336 and the inputs of the postcoder 344. Moreover, the controller 348, the transmitters 342a, 342b and receivers 342c, 342d are included in the portion 327b, but are omitted from FIG. 3E for clarity.

Figure 3F:
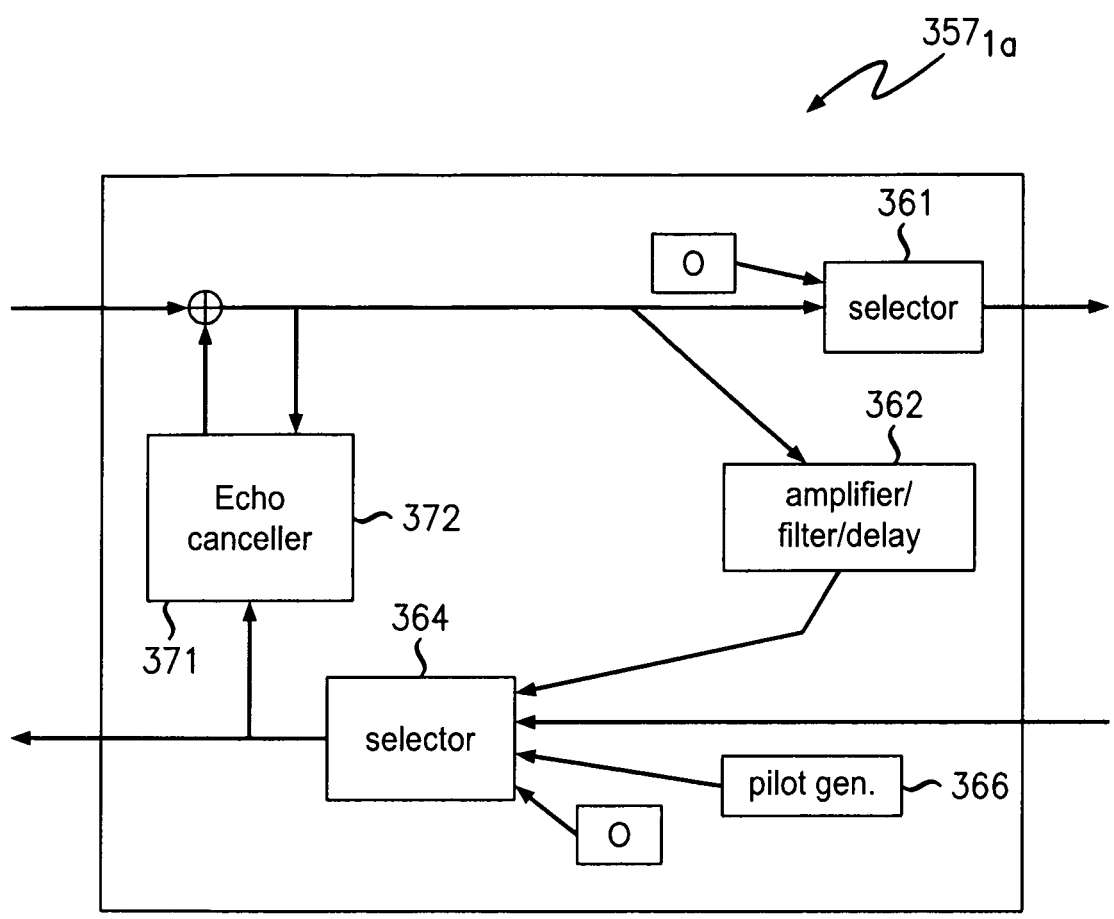
FIG. 3F illustrates a TTVR with echo cancellation according to an example embodiment.

FIG. 3F illustrates a TTVR with echo cancellation according to an example embodiment. FIG. 3F illustrates a TTVR $357_{1a}$. The TTVR $357_{1a}$ is the same as the TTVR $357_1$, except the TTVR $357_{1a}$ includes an echo canceller 372 coupled to a downstream input and an upstream output (output of the selector 364). Moreover, the controller 370 is included in the TTVR $357_{1a}$, but is omitted from FIG. 3F for clarity.

The NEXT canceller 349 may implement filters designed to eliminate near-end crosstalk (NEXT) (interference between different transceivers at or near the same location) as well as echo (interference from transmitter to receiver within the same transceiver). The echo canceller 372 may implement a filter designed to eliminate echo. The cancellation of NEXT and echo allows full-duplex communication between the distribution point 310 and the CPE $350_1$.

A frequency-domain implementation of the NEXT canceller 349 is shown in FIG. 3E, and a time-domain implementation of the echo canceller 372 is shown in FIG. 3F.

In FIG. 3E, copies of the precoder 336 output signals are passed to the NEXT canceller 349. The NEXT canceller 349 applies filter coefficients to the precoder 336 output signals to obtain a cancellation signal that is added to the upstream postcoder 344 inputs. The resulting signals are fed back to the NEXT canceller 349, for use in training the filter coefficients. In an alternative embodiment, a time-domain NEXT canceller could operate on time domain samples coming out of the parallel-to-serial units 340a, 340b.

In FIG. 3F, copies of TTVR $357_{1a}$ output signals are passed to the echo canceller 372. The echo canceller 372 applies filter coefficients to these signals to obtain a cancellation signal that is added to a downstream TTVR input signal. The resulting signals are fed back to the echo canceller 372, for use in training the filter coefficients.

Figure 4A:
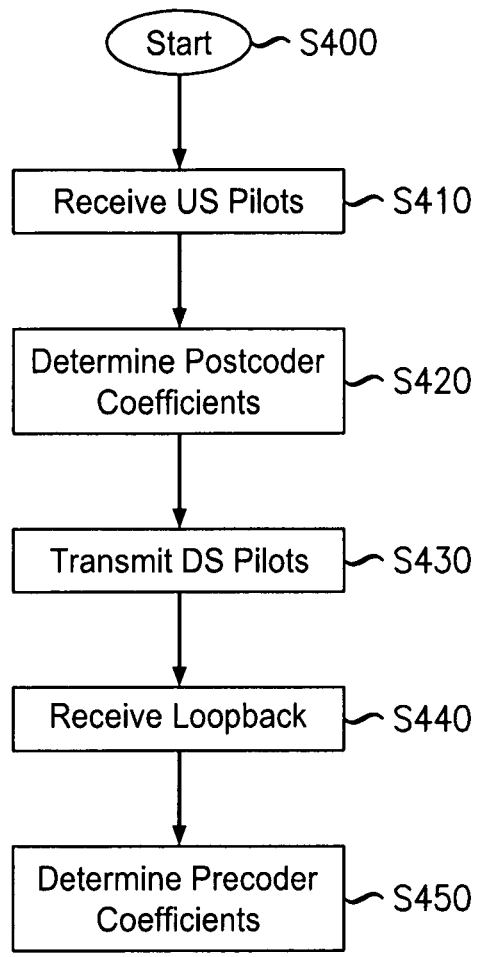
FIG. 4A illustrates a method of reducing crosstalk using a pilot loop-back according to an example embodiment.

FIG. 4A illustrates a method of reducing crosstalk using a pilot loop-back.

In general, crosstalk cancellation across communication lines is performed through vectoring. Precoding and postcoding are performed at the operator side of the distribution point 310, where all lines are terminated.

In order to achieve downstream crosstalk cancellation, a process of estimation is used by the distribution point 310 to determine the correct precoder coefficients (filter crosstalk coefficients). The determination of precoder coefficients is performed by sending a pilot signal in the downstream direction, and then providing a feedback over an upstream communication channel.

The example embodiment of FIG. 4A provides a method that estimates the downstream crosstalk channel with minimal signal processing capabilities at the customer side (CPEs $350_1$-$350_n$). In particular, the CPEs $350_1$-$350_n$ have the ability to send signals upstream, but there may be no digital communication established between distribution point 310 and the CPEs $350_1$-$350_n$ (or where only a minimal, low-bandwidth signaling channel is established). In the example embodiment of FIG. 4A, the distribution point 310 first estimates an upstream channel and then a downstream channel.

In one conventional manner, a distribution point (operator side) sends a downstream pilot signal to a CPE (customer side). The CPE uses the received pilot to estimate downstream channel coefficients. The estimated downstream channel coefficients are quantized and sent upstream over an existing digital communication channel. However, this conventional manner requires an upstream digital communication session to be established before the estimation takes place. The session needs to have reasonably high data rate in order for the communication to take place quickly.

In another conventional manner, a CPE sends an upstream pilot signal to a distribution point. The distribution point uses the received pilot to estimate upstream channel coefficients. Downstream channel coefficients are derived from the upstream coefficients using channel reciprocity feature of isotropic transmission media. However, reciprocity does not necessarily hold for twisted pair channels, particularly in the presence of bridged taps and other non-ideal topologies.

In the G.vector standard, a distribution point sends a downstream pilot signal. The CPE measures and quantizes the difference between received pilot signal and the transmitted signal (the error signal). Quantized error measurements are sent upstream over an existing digital communication session. The distribution point estimates downstream channel coefficients based on quantized error measurements. However, G.vector requires an upstream digital communication session with reasonable high data rate (so that initialization does not take a long time).

In example embodiments, at least one purpose of using G.hn processing devices is to establish a high-data rate digital communication session between the distribution point 310 and the CPEs $350_1$-$350_n$. Binary data located at one side may be communicated reliably to the other side.

Moreover, the upstream and downstream channels are physical entities. If a certain changing voltage is input to one of the upstream and downstream channels, a resulting voltage is generated at an output. In at least one example embodiment, a loop-back channel is created by concatenating the downstream and upstream channels. More specifically, the loop-back channel is created by the system 300 configured to have the TTVRs $357_1$-$357_n$ repeat back what they receive, which may be after amplification or filtering. In other words, the loop-back channel is created with processing devices, which takes the digital samples coming from the LDs $155_1$-$155_n$, optionally performs processing in the time domain, optionally further delays the samples, and sends corresponding digital samples back to the LD $155_1$-$155_n$ to send upstream.

As will be described with reference to FIG. 4A, in at least one example embodiment, a CPE amplifies and loops back the received downstream pilots into the upstream direction. A distribution point can then estimate the downstream crosstalk from the received loop-back signal, based on knowledge of the upstream channel obtained separately from upstream pilots. The loop-back approach assumes a TDD or full-duplex rather than FDD system because the pilot signals cover all used frequencies, both upstream and downstream. More specifically, it is not necessary that the data communications use all frequencies in both directions, but the devices are permitted to send pilot signals on all frequencies in both directions during the estimation process.

Figure 4B:
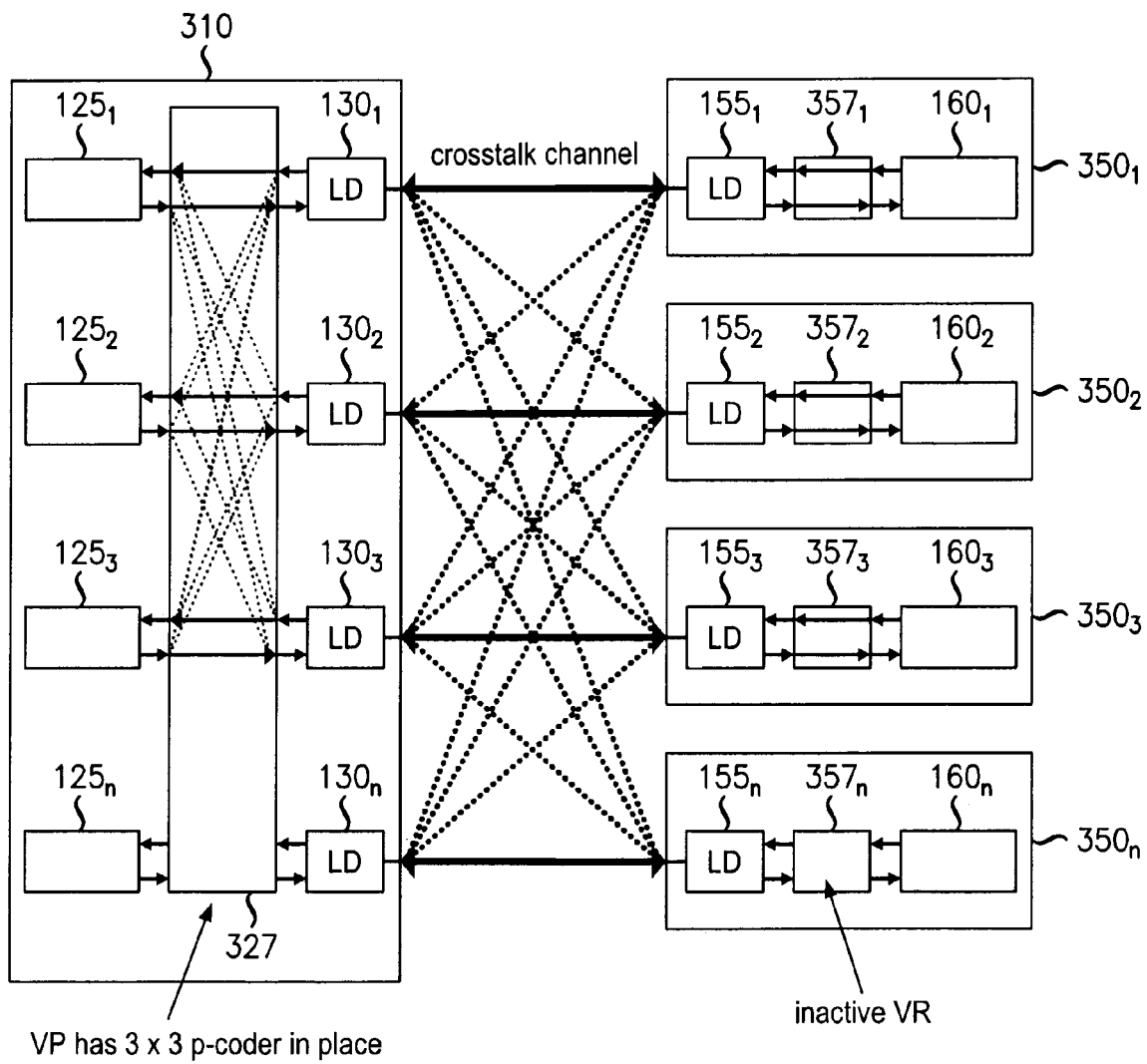
FIG. 4B illustrates a stage in the method of FIG. 4A.
Figure 4C:
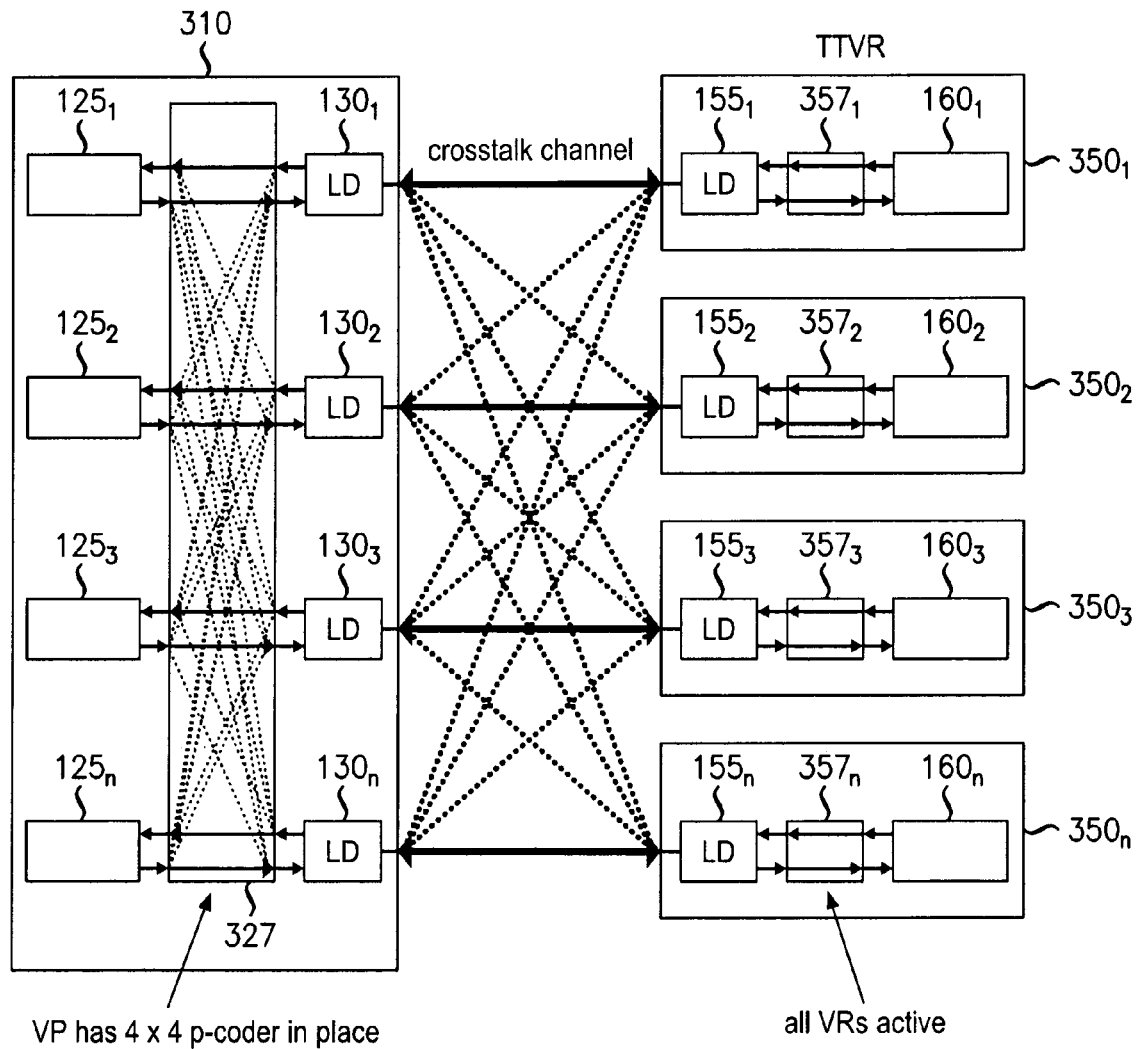
FIG. 4C illustrates a stage in the method of FIG. 4A.

To aid in the description of the method of FIG. 4A, FIGS. 4B-4C are used. Moreover, the method of FIG. 4A is described with reference to the system 300. However, it should be understood that the method of FIG. 4A may be performed by systems different than the system 300.

As shown, in FIG. 4A, the method starts at S400. At the start, some communication sessions may be active. For example, FIG. 4B illustrates the system 300 where three communication sessions are active. More specifically, communication channels between the processing devices $125_1$-$125_3$ and $160_1$-$160_3$ are active. One active communication channel is represented by the solid line path from G.hn processing device $125_1$ at the distribution point, through the TTVP 327, through the LD $130_1$, across the twisted pair line, through another LD $155_1$, through the TTVR $357_1$, and finally to the G.hn processing device $160_1$ in the CPE $350_1$. Similarly, solid line paths represent active communication channels between processing devices $125_2$ and $160_2$, and between $125_3$ and $160_3$. As should be understood, the communication channels over twisted pair lines cause crosstalk which are represented by the dashed lines between the distribution point 310 and the CPEs $350_1$-$350_n$ in FIG. 4B. The solid and dashed lines within the TTVP 327 represent 3×3 precoder and post-compensation matrices that are determined by the TTVP 327 based on estimation of the crosstalk channels between the line drivers $130_1$-$130_3$ and $155_1$-$155_3$, and which are designed to mitigate the effects of this crosstalk. More specifically, each downstream and upstream transmission over a twisted pair line causes crosstalk with other transmissions on the remaining twisted pair lines. Consequently, at this stage, the TTVP 327 implements a 3×3 precoder and a 3×3 postcompensation filter.

For example, with narrowband channels at a particular frequency f, the upstream channel is represented by a complex matrix $$H_U = (I+G_U)D_U \qquad (1)$$

where $G_U$ is a normalized upstream crosstalk matrix and $D_U$ is an upstream diagonal matrix representing the diagonal elements of Hu and I is an identity matrix (a matrix with 1 on the diagonal, and all off-diagonal elements being zero).

The downstream channel is $$H_D = D_D(I+G_D) \qquad (2)$$

where $G_D$ is a normalized downstream crosstalk matrix and $D_D$ is a downstream diagonal matrix of direct gains. As should be understood, the upstream and downstream channels are multiple-input-multiple-output (MIMO channels).

Filter coefficients in the postcoder 344 and the downstream precoder 336 are represented by matrices $C_U$ and $C_D$, respectively. The notation C will represent the filter coefficients at various points in time. The TTVP 327 determines C based on estimates of crosstalk channels and determines C based on activation/deactivation events and/or periodically.

Referring back to FIG. 4A, the distribution point 310 receives the upstream pilot signals from the TTVRs $357_1$-$357_n$ at S410. More specifically, when the CPE $350_n$, not currently having an active communication session with the distribution point, requests to transmit data, the TTVRs $357_1$-$357_n$ may temporarily prevent data being transferred from the processing devices $160_1$-$160_3$ to the LDs $155_1$-$155_3$, respectively, and instead send pilot signals to the LDs $155_1$-$155_3$, which are transmitted upstream by the LDs $155_1$-$155_3$ and received by the TTVP 327. The TTVR $357_n$ also sends a pilot signal to the LD $155_n$, which is transmitted upstream and received by the TTVP 327. The transmitted pilot signals are mutually orthogonal.

The TTVRs $357_1$-$357_n$ and the TTVP 327 use the control channel to coordinate and synchronize transmission of the pilot signals. The TTVR $357_n$ alerts the TTVP 327 that the CPE $350_n$ wants to activate. The TTVP 327 then instructs the $TTVR_1$-$TTVR_n$ to send the upstream pilot sequence. The TTVP 327 knows when the upstream pilot is to be sent, and intercepts the resulting upstream signals.

In at least one example embodiment, a G.hn processing device, e.g. $125_1$, sees a sequence of inserted zero values instead of a usual data signal. For example, the controller 348 may transmit a command to the selector 332c to indicate that channel estimation and precoder/postcoder coefficient determinations are being performed. Based on the command received from the controller 348, the selector 332c may transmit the zero values to the processing device $125_1$ instead of the output from the postcoder 344. The reception of the zero values may result in a burst of errors. However, the processing device $125_1$ includes capabilities that allow recovery from error bursts, as are also caused, for example, by impulse noise.

In at least another example embodiment, the selectors 338c, 338d may not be present or the controller 348 may instruct the selects 338c, 338d to pass the output of the postcoder 344 to the processing device 1251. The G.hn protocol may be extended to be aware of the pilot sequences and, for example, to temporarily stop sending and receiving data when the pilot sequence is being sent.

Since the CPE $350_n$ requests to transmit data, the TTVP 327 determines new upstream channel coefficients to include the channels from the LDs $155_1$-$155_n$ into the activating LD $130_n$, and the channels from the activating LD $155_n$ into the LDs $130_1$-$130_n$. Putting these new coefficients with the 3×3 channel matrix of previously active lines creates a new 4×4 channel matrix.

Therefore, at S420, the TTVP 327 determines the postcoder coefficients based on the received pilot signals. For a system with n lines, the upstream resultant channel $R_u$ at frequency f may be represented as an n by n matrix of the form:

$$R_U = C_U(I+G_U)D_U \quad (3)$$

where $C_U$ is an n by n postcoder matrix acting on frequency f, I is an n by n identity matrix, $D_U$ is an n by n diagonal matrix representing the direct gains in the upstream channel at frequency f, and $G_U$ is an n by n normalized crosstalk channel matrix for frequency f.

The TTVP 327 may determine the upstream channel $R_u$ as follows. A pilot sequence consists of S DMT symbols, where S is generally at least as large as the number of lines in the system. Each symbol has a complex value at one of F frequencies, f=0, . . . , F–1. There is a pilot sequence associated with each line.

The complex value to be sent on the frequency f during symbol s on a line k is denoted by $P_k(f,s)$.

The correlation between a symbol sequence x(s) and y(s) is defined as:

$$\langle x(s), y(s) \rangle = \sum_{s=1}^{S} x(s)\overline{y(s)} \quad (4)$$

The pilot sequences for different lines k and j are mutually orthogonal, meaning that their correlation is zero, such that:

$$\langle P_k(f,s), P_j(f,s) \rangle = 0 \quad (5)$$

for all f and for any k not equal to j.

DMT modulation is used by the TTVP 327 and the TTVRs $357_1$-$357_n$ to convert the frequency-domain representation of a given pilot sequence to the corresponding time-domain representation. That is, for a given symbol s, the F complex frequency domain values $P_k(f,s)$, f=0, . . . , F–1, are transformed by Inverse FFT (IFFT) as is well-known in DMT modulation to obtain 2F real, time-domain samples. These time-domain samples are cyclically extended and windowed, as is well-known in DMT modulation, to obtain T time domain samples, denoted $p_k(t,s)$ for t=0, . . . , T–1.

To transmit a pilot sequence, a first TTVR (e.g., $357_1$) first sends all of the time samples $p_k(t,1)$ corresponding to symbol 1, then all time samples $p_k(t,2)$ corresponding to symbol 2, and continues to transmit the time samples for each symbol. The first TTVR may transmit the symbols immediately one after the other, or they may be sent intermittently, with a number of normal upstream data samples from the CPE $350_1$ sent in between pilot symbols. The TTVR pilot symbols may be matched to a FFT size used in the TTVP signal processing.

The TTVP 327 on line k receives time samples from the LD $130_1$ corresponding to the pilot symbol s. These time samples may be denoted as $y_k(t,s)$. A subset of 2F consecutive time samples from each symbol may be selected by the TTVP 327, as is well-known in DMT modulation, and transformed by FFT to obtain F complex frequency domain values denoted $Y_k(f,s)$. After applying the postcoder 344, the resulting signals may be denoted $W_k(f,s)$. The TTVP 327 can perform signal processing on the received signals in order to estimate the resultant upstream crosstalk channel coefficients (resulting from the concatenation of the crosstalk channel and the postcoder 344). In particular, the TTVP 327 may estimate the resultant upstream channel value in row v and column d by computing:

$$\hat{R}_{v,d}(f) = \frac{\langle W_v(f,s), P_d(f,s) \rangle}{\langle P_d(f,s), P_d(f,s) \rangle} \quad (6)$$

In other words, the resultant upstream channel value in row v and column d is determined by correlating the received, postcoded symbols on line v with pilot symbols sent on the line d, and dividing by the result of correlating the pilot symbols sent on the line d with themselves.

In one example embodiment, time-domain duplexing (TDD) is used to avoid near-end crosstalk. That is, downstream and upstream transmissions are alternated in time. The physical layer FTTdp protocol is responsible for ensuring TDD transmission of data signals. However, during the crosstalk estimation phases, the TTVP 327 and TTVRs $357_1$-$357_n$ work together to ensure that the pilots are sent and received using TDD, regardless of input signals received from the processing devices $125_1$-$125_n$ and $160_1$-$160_n$.

During all pilot sequence/crosstalk estimation phases in one example embodiment, the downstream output selectors 361 of all TTVRs $357_1$-$357_n$ and the upstream output selectors 332c, 332d of the TTVP 327 are all set to send zero values to the associated processing devices $125_1$-$125_n$ and $160_1$-$160_n$. This ensures that the higher layer is not directly affected by the pilot sequences—it is only affected by a temporary loss of signal.

The outputs of the TTVRs $357_1$-$357_n$ and TTVP 327 that face the LDs $130_1$-$130_n$ and $155_1$-$155_n$ are controlled as follows during the different phases.

During the upstream estimation phase, TDD is enforced as follows. The TTVR upstream output selectors 364 of all TTVRs $357_1$-$357_n$ are set to send the upstream pilot sequences. The TTVP downstream output selectors 332a, 332b for all lines are set to send zero values (so that received pilot values are not corrupted by NEXT).

Referring back to FIG. 4B, in a system with 4 lines, where 3 lines are active, and a fourth line about to initialize, $C_u$ is a 4×4 postcoder, where the upper right 3×3 submatrix is a 3×3 postcoder, and where the remaining matrix elements are taken from the identity matrix I.

After determining the upstream channel $R_u$, the TTVP 327 determines new postcoder coefficients to be implemented by the postcoder 344 as follows:

$$C'_U = (R_U \operatorname{diag}(C_U^{-1} R_U)^{-1})^{-1} C_U \qquad (7)$$

Using the new postcoder coefficients $C'_U$, the TTVP 327 cancels crosstalk from the upstream channel, resulting in $$R'_U = D_U \qquad (8)$$

In another example embodiment, the TTVP 327 may update the postcoder coefficients $C_u$ implemented in the postcoder 344 using a first-order approximation to the channel inverse. Namely, $$C'_U = C_U + I - R_U \operatorname{diag}(R_U)^{-1} \qquad (9)$$

This is also a reasonable embodiment requiring less computation, but would not cancel the crosstalk as perfectly. An example embodiment of intermediate complexity is $$C'_U = (2I - R_U \operatorname{diag}(R_U)^{-1}) C_U \qquad (10)$$

Equations (7) and (10) relate to a method as taught in Multiplicative Updating Of Precoder Or Postcoder Matrices For Crosstalk Control In A Communication System, U.S. patent application Ser. No. 13/016,376, the entire contents of which is incorporated by reference.

After the upstream channel is determined by the TTVP 327, the downstream channel is measured by the TTVP 327 using downstream pilots and upstream loop-back. Referring back to FIG. 4A, the TTVP 327 transmits orthogonal downstream pilot signals across the communication lines L1-Ln to associated TTVRs $357_1$-$357_n$ at S430, once the upstream channel $R'_U$ is determined. At S430, the TTVP 327 ignores data being sent from the processing devices $125_1$-$125_n$ and the TTVRs $357_1$-$357_n$ ignore data from the processing devices $160_1$-$160_n$.

With regards to upstream and downstream pilot sequences, in one example embodiment, the upstream and downstream pilot signals are designed so that $$|P_k(f,s)|^2 \leq M(f) \qquad (11)$$

where M(f) specifies the maximum power for transmission at frequency f. The sum of $|P_k(f,s)|^2$ over all frequencies does not exceed any total power constraint. The peak to average ratio of $p_k(t,s)$ allows high-fidelity modulation by the LDs (with little or no clipping).

For example, the pilot sequences may be based on a base symbol B(f) that satisfies the power constraints such that a corresponding time-domain representation b(t) satisfies a peak-to-average ratio condition. For example, to achieve a good peak-to-average ratio condition with high probability, the elements of B(s) might be 4-QAM values chosen independently at random for each tone.

For each line k, a binary sequence $q_k(s)$ is determined by the TTVP 327 (i.e. $q_k(s) = -1$ or 1 for each s) such that the binary sequences assigned to the different lines are mutually orthogonal. For example, the sequences might be obtained from rows of an S×S Walsh-Hadamard matrix.

The pilot sequences are constructed by the TTVP 327 using outer products of the base symbols with the binary sequences, as $$P_k(f,s) = B(f) q_k(s) \qquad (12)$$

At S430, the TTVR upstream output selectors 364 of all TTVRs $357_1$-$357_n$ are set to send zero values. The TTVP downstream output selectors 332a, 332b for all lines are set to send the downstream pilot sequences. During this part, the received values are buffered by the TTVRs $357_1$-$357_n$ in the amplification, filtering and delay unit 362.

At S440, each TTVR $357_1$-$357_n$ loops back each pilot signal that is received. In other words, each TTVR $357_1$-$357_n$ retransmits the received pilot signals in the upstream direction. In some example embodiments, each TTVR $357_1$-$357_n$ may filter and amplify the pilot signals that are received and then retransmit the pilot signal.

The TTVR upstream output selectors 364 of all TTVRs $357_1$-$357_n$ are set to the amplified, filtered, and delayed signal stored in the amplification, filtering and delay unit 362. The TTVP downstream output selectors 332a, 332b for all lines are set to send zero values (so that received pilot values are not corrupted by NEXT).

The amplification used in the loop-back can be done in many ways by the TTVRs $357_1$-$357_n$. For example, a diagonal amplification matrix L(f) may be implemented without violating power constraints at the CPEs $350_1$-$350_n$.

In different example embodiments, the filtering and amplification parameters are specified by the CPEs $350_1$-$350_n$, based on knowledge of the upstream channel. Or, the parameters are determined by the CPEs $350_1$-$350_n$ based on properties of the received downstream pilot signals.

Also at S440, the distribution point 310 receives loop-backed pilot signals. Upon receiving the loop-backed pilot signals, the TTVP 327 determines the loop-back channel coefficients. The loop-back channel is considered to be formed from the concatenation of the downstream channel, the amplification filter (if any), and the upstream channel.

The loop-back channel may defined as:

$$R_L = C'_U (I + G_U) D_U L D_D (I + G_D) C_D = D_U L D_D (I + G_D) C_D \qquad (13)$$

For the downstream, loop-back case, the pilot sequences can be defined in the same way as described above, but the time domain pilots $p_k(t,s)$ are conveyed from the TTVP 327 to the LDs 130k. Signals are looped back upstream by the TTVRs $357_1$-$357_n$, and then $y_k(t,s)$ represents the resulting time-domain values sent back from the LDs $130_1$-$130_n$ to the TTVP 327. The TTVP 327 processes the values $y_k(t,s)$ as above to obtain postcoded symbols $W_k(f,s)$, which are correlated with pilot symbols as above in Equation (6) to obtain estimates of the resultant loop-back channel value in row v and column d.

At S440, the TTVP 327 receives the result of sending the pilot signals through the loop-back channel $R_L$. These received signals, together with the knowledge of the transmitted pilots, can be used in S450 to determine the precoder coefficients. Based on knowledge of $R_L$ and $C_D$, the TTVP 327 generates new precoder coefficients $$C'_D = C_D (\operatorname{diag}(R_L C_D^{-1})^{-1} R_L)^{-1} \qquad (14)$$

which diagonalize the loop-back channel, resulting in $$R'_L = D_U L D_D \qquad (15)$$

where L is the diagonal matrix with i-th diagonal elements being the loop-back amplification applied by the TTVR on communication line i. In another example embodiment, the TTVP 327 may update the coefficients implemented in the precoder 336 using a first-order approximation to the channel inverse. Namely, $$C'_D = C_D + I - \operatorname{diag}(R_L)^{-1} R_L \qquad (16)$$

Another example embodiment of intermediate complexity is $$C'_D = C_D(2I - \mathrm{diag}(R_L)^{-1}R_L) \qquad (17)$$

The downstream channel is also diagonalized $$R'_D = D_D(I + G_D)C'_D = D_D \qquad (18)$$

As a result, the concatenation of the updated precoder 336 and the downstream channel provides a nearly crosstalk-free resultant channel from processing devices $125_1$-$125_n$ to processing devices $160_1$-$160_n$, and the concatenation of the upstream channel and the updated postcoder provides a nearly crosstalk-free resultant channel from processing devices $160_1$-$160_n$ to processing devices $125_1$-$125_n$. An active communication session can then be established on the line Ln, as shown in FIG. 4C, without affecting existing active sessions on L1-L3. The above discussion was given in the context of a single narrowband channel at frequency f. The method also works when there are multiple channels at multiple frequencies, for example in a discrete multi-tone system. Each channel matrix previously described then becomes a matrix-valued function of frequency, e.g., $R_U(f)$.

Figure 5:
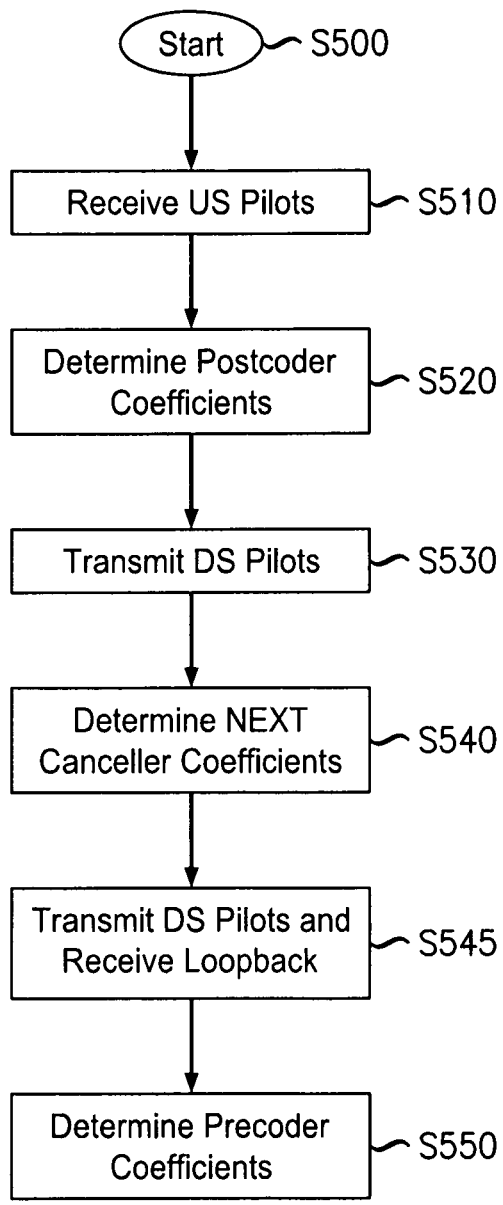

FIG. 5 illustrates a method of reducing crosstalk using a pilot loop-back with NEXT and echo cancellation. The method shown in FIG. 5 may be performed by at least the TTVP shown in FIG. 3E and the TTVR shown in FIG. 3F. In FIG. 5, the TTVP receives upstream pilots at S510, determines postcoder coefficients at S520, transmits downstream pilots at S530, determines NEXT canceller coefficients at S540, transmits downstream pilots and receives loopback pilots at S545 and determines precoder coefficients at S550.

Steps S500, S510, S520 and S550 are the same or substantially the same as the steps S400, S410, S420 and S450, respectively, shown in FIG. 4A. Therefore, steps S500, S510, S520 and S550 will not be described in greater detail for the sake of brevity.

At S530, the TTVP transmits downstream pilots to determine the NEXT canceller coefficients at S540. The NEXT canceller coefficients may be determined using any known method. Moreover, at S530, a TTVR may determine the coefficients implemented in the echo canceller.

In FIG. 5, the steps S430 and S440, of FIG. 4, can be executed simultaneously, instead of sequentially. Therefore, at S545, the TTVP transmits downstream pilots and receives loopback pilot signals simultaneously. For example, information may travel down the line in a shorter time than the time a pilot symbol or an entire pilot sequence is sent. Since the NEXT canceller is trained at S540, and the echo canceller is trained at S530, then full-duplex can be used and the signals sent upstream and downstream don't interfere with each other. Therefore, while the TTVP is partway through sending the pilot sequence, the TTVR receives the first values of the pilot sequence. In full-duplex mode, the TTVR starts sending received values of the downstream pilots upstream (the loopback) as soon as the downstream pilots are received, without waiting for the TTVP to finish sending the last values of the pilot sequence.

As described, the methods of FIGS. 4A and 5 allow estimation of a downstream MIMO (multiple input, multiple output) channel without requiring digital upstream communication sessions. Consequently, CPE components designed for SISO (single input, single output) communications may be used while building a MIMO system capable of cancelling crosstalk and hence achieving significantly higher data rates.

Compared with conventional methods of downstream estimation, example embodiments facilitate taking customer-side transceiver hardware and software modules designed for SISO channels and re-using them in a MIMO context, while achieving crosstalk cancellation.

In particular, conventional methods for the CPE to provide feedback to the operator side over an upstream digital communication channel. The feedback can be in the form of quantized estimates of downstream channel parameters, or quantized measurements of received pilot signals, error signals, and the like. The G.vector standard can be taken as a representative example of a conventional approach.

For example, changes introduced by MIMO (G.vector) relative to SISO (VDSL2) include normal SISO initialization procedure is interrupted at least once for a MIMO estimation phase. This is because some initialization is required to establish a basic communication channel upstream, necessary for crosstalk estimation. However, the initialization cannot be optimized until after crosstalk estimation is complete. Channels for upstream feedback of training information have to be established. In the case of G.vector, there is a special channel created for feedback during initialization, and another mechanism defined for feedback during ordinary operation. Error measurements or crosstalk estimates need to be collected and then sent on the feedback channel. This process needs to be configured and managed.

Consequently, the digital feedback in conventional methods requires significant changes to software, firmware, and or hardware, relative to a system that had only to deal with SISO.

By contrast, in example embodiments, the MIMO functionality is separated from the SISO functionality. In terms of the signal path, the loop-back occurs early in the processing chain, immediately after the analog to digital conversion. Hence circuits involved in providing feedback can be physically or logically separated from the remaining SISO components.

In terms of time, the MIMO training can all be done before the ordinary SISO training procedure. Hence, there is little or no need to change the SISO training software or firmware— the MIMO channel is diagonalized (virtually creating multiple SISO channels) before the SISO initialization process starts.

As described above, example embodiments provide for a transparent method of reducing and/or eliminating crosstalk with short distances (e.g., less than 200 m). Since distribution point is only 200 m away, a home network G.hn processing device may be used in systems that reduce crosstalk. Also, using G.hn processing devices instead of specialized processing devices reduces the cost.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of determining crosstalk in a multiple-input-multiple output (MIMO) system, the method comprising:
receiving, from at least one first remote node, upstream pilots on an upstream channel;
determining upstream channel coefficients based on the received pilots;
transmitting, to the at least one first remote node, downstream pilots on a downstream channel;
receiving, from the at least one first remote node, loopback pilots on the upstream channel, the loopback pilots being loopback signals of the downstream pilots; and
determining downstream channel coefficients based on the received loopback pilots and the determined upstream channel coefficients.

2. The method of claim 1, wherein the upstream pilots are mutually orthogonal to upstream pilots received on other upstream channels.

3. The method of claim 1, wherein the transmitting the downstream pilots transmits the downstream pilots after receiving the upstream pilots.

4. The method of claim 1, wherein the downstream pilots are mutually orthogonal.

5. The method of claim 1, wherein the loopback pilots are amplified by the at least one remote node.

6. The method of claim 5, wherein the loopback pilots are at least one of filtered and delayed by the at least one remote node.

7. The method of claim 1, further comprising:
precoding data based on the downstream channel coefficients; and
transmitting the precoded data to the remote node.

8. The method of claim 1, further comprising:
receiving data from the at least one first remote node; and
postcoding the data based on the upstream channel coefficients.

9. The method of claim 1, wherein the receiving upstream pilots includes,
receiving a request to transmit data from one of the at least one first remote node, and
receiving the upstream pilots from the at least one first remote node and the other first remote nodes.

10. The method of claim 9, wherein the determining upstream channel coefficients includes,
determining the upstream channel coefficients based on previous upstream channel coefficients, the previous upstream channel coefficients being channel coefficients before receiving the request to transmit data.

11. The method of claim 1, further comprising:
precoding data based on the downstream channel coefficients; and
transmitting the precoded data to the at least one first remote node.

12. The method of claim 1, further comprising:
receiving data from the at least one first remote node; and
postcoding the data based on the upstream channel coefficients.

13. A processor configured to,
receive, from at least one first remote node, upstream pilots on an upstream channel;
determine upstream channel coefficients based on the received pilots;
transmit, to the at least one first remote node, downstream pilots on a downstream channel;
receive, from the at least one first remote node, loopback pilots on the upstream channel, the loopback pilots being loopback signals of the downstream pilots; and
determine downstream channel coefficients based on the received loopback pilots and the determined upstream channel coefficients.

14. The processor of claim 13, wherein the processor is configured to transmit the downstream pilots orthogonally.

15. The processor of claim 13, wherein the processor is configured to,
precode data based on the downstream channel coefficients; and
transmit the precoded data to the remote node.

16. The processor of claim 13, wherein the processor is configured to,
receive data from the at least one first remote node; and
postcode the data based on the upstream channel coefficients.

17. The processor of claim 13, wherein the processor is configured to,
receive a request to transmit data from one of the at least one first remote node, and
receive the upstream pilots from the at least one first remote node and the other first remote nodes.

18. The processor of claim 17, wherein the processor is configured to,
determine the upstream channel coefficients based on previous upstream channel coefficients, the previous upstream channel coefficients being channel coefficients before receiving the request to transmit data.

* * * * *